US012726492B2

(12) United States Patent
Berninger et al.

(10) Patent No.: US 12,726,492 B2
(45) **Date of Patent: *Sep. 1, 2026**

(54) SYSTEM AND METHOD FOR AUTOMATICALLY ASSOCIATING CYBERSECURITY INTELLIGENCE TO CYBERTHREAT ACTORS

(71) Applicant: Google LLC, Mountain View, CA (US)

(72) Inventors: Matthew Berninger, Denver, CO (US); Barry Vengerik, Montclair, NJ (US)

(73) Assignee: GOOGLE LLC, Mountain View, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 18/757,257

(22) Filed: Jun. 27, 2024

(65) Prior Publication Data

US 2024/0348629 A1 Oct. 17, 2024

Related U.S. Application Data

(63) Continuation of application No. 17/676,755, filed on Feb. 21, 2022, now Pat. No. 12,063,229, which is a (Continued)

(51) Int. Cl.

*H04L 9/40* (2022.01)
*G06F 18/213* (2023.01)
*G06N 20/00* (2019.01)

(52) U.S. Cl.

CPC ........ *H04L 63/1416* (2013.01); *G06F 18/213* (2023.01); *G06N 20/00* (2019.01); *H04L 63/102* (2013.01); *H04L 63/1441* (2013.01)

(58) Field of Classification Search

CPC ............... H04L 63/1416; H04L 63/102; H04L 63/1441; G06N 20/00

See application file for complete search history.

(56) References Cited

U.S. PATENT DOCUMENTS 4,292,580 A 9/1981 Ott et al.
5,175,732 A 12/1992 Hendel et al.
(Continued)

FOREIGN PATENT DOCUMENTS

GB 2439806 1/2008
GB 2490431 10/2012
(Continued)

OTHER PUBLICATIONS

Abdullah et al., “Visualizing Network Data for Intrusion Detection”, Sixth Annual Institute of Electrical and Electronics Engineers Systems, Man, and Cybernetics Society, West Point, New York, United States, Jun. 15-17, 2005, pp. 100-108.
(Continued)

*Primary Examiner* — Meng Li
(74) *Attorney, Agent, or Firm* — DORITY & MANNING P.A.

(57) ABSTRACT

A computerized method for associating cyberthreat actor groups responsible for different cyberthreats is described. The method involves generating a similarity matrix based on content from received clusters of cybersecurity information. Each received cluster of cybersecurity information is assumed to be associated with a cyberthreat. The similarity matrix is composed via an optimized equation combining separate similarity metrics, where each similarity metric of the plurality of similarity metrics represents a level of correlation between at least two clusters of cybersecurity information, with respect to a particular aspect of operations described in the clusters. The method further involves that, in response to queries directed to the similarity matrix, generating a listing of a subset of the clusters of cybersecurity information having a greater likelihood of being associated with cyberthreats caused by the same cyberthreat actor group.

20 Claims, 11 Drawing Sheets

Related U.S. Application Data continuation of application No. 16/450,579, filed on Jun. 24, 2019, now Pat. No. 11,258,806.

(56) References Cited

U.S. PATENT DOCUMENTS 5,319,776 A 6/1994 Hile et al.
5,440,723 A 8/1995 Arnold et al.
5,490,249 A 2/1996 Miller
5,657,473 A 8/1997 Killean et al.
5,802,277 A 9/1998 Cowlard
5,842,002 A 11/1998 Schnurer et al.
5,960,170 A 9/1999 Chen et al.
5,978,917 A 11/1999 Chi
5,983,348 A 11/1999 Ji
6,088,803 A 7/2000 Tso et al.
6,092,194 A 7/2000 Touboul
6,094,677 A 7/2000 Capek et al.
6,108,799 A 8/2000 Boulay et al.
6,154,844 A 11/2000 Touboul et al.
6,269,330 B1 7/2001 Cidon et al.
6,272,641 B1 8/2001 Ji
6,279,113 B1 8/2001 Vaidya
6,298,445 B1 10/2001 Shostack et al.
6,357,008 B1 3/2002 Nachenberg
6,424,627 B1 7/2002 Sorhaug et al.
6,442,696 B1 8/2002 Wray et al.
6,484,315 B1 11/2002 Ziese
6,487,666 B1 11/2002 Shanklin et al.
6,493,756 B1 12/2002 O'Brien et al.
6,550,012 B1 4/2003 Villa et al.
6,775,657 B1 8/2004 Baker
6,831,893 B1 12/2004 Ben Nun et al.
6,832,367 B1 12/2004 Choi et al.
6,895,550 B2 5/2005 Kanchirayappa et al.
6,898,632 B2 5/2005 Gordy et al.
6,907,396 B1 6/2005 Muttik et al.
6,941,348 B2 9/2005 Petry et al.
6,971,097 B1 11/2005 Wallman
6,981,279 B1 12/2005 Arnold et al.
7,007,107 B1 2/2006 Ivchenko et al.
7,028,179 B2 4/2006 Anderson et al.
7,043,757 B2 5/2006 Hoefelmeyer et al.
7,058,822 B2 6/2006 Edery et al.
7,069,316 B1 6/2006 Gryaznov
7,080,407 B1 7/2006 Zhao et al.
7,080,408 B1 7/2006 Pak et al.
7,093,002 B2 8/2006 Wolff et al.
7,093,239 B1 8/2006 Van der Made
7,096,498 B2 8/2006 Judge
7,100,201 B2 8/2006 Lzatt
7,107,617 B2 9/2006 Hursey et al.
7,159,149 B2 1/2007 Spiegel et al.
7,213,260 B2 5/2007 Judge
7,231,667 B2 6/2007 Jordan
7,240,364 B1 7/2007 Branscomb et al.
7,240,368 B1 7/2007 Roesch et al.
7,243,371 B1 7/2007 Kasper et al.
7,249,175 B1 7/2007 Donaldson
7,287,278 B2 10/2007 Liang
7,308,716 B2 12/2007 Danford et al.
7,328,453 B2 2/2008 Merkle, Jr. et al.
7,346,486 B2 3/2008 Ivancic et al.
7,356,736 B2 4/2008 Natvig
7,386,888 B2 6/2008 Liang et al.
7,392,542 B2 6/2008 Bucher
7,418,729 B2 8/2008 Szor
7,428,300 B1 9/2008 Drew et al.
7,441,272 B2 10/2008 Durham et al.
7,448,084 B1 11/2008 Apap et al.
7,458,098 B2 11/2008 Judge et al.
7,464,404 B2 12/2008 Carpenter et al.
7,464,407 B2 12/2008 Nakae et al.
7,467,408 B1 12/2008 O'Toole, Jr.
7,478,428 B1 1/2009 Thomlinson
7,480,773 B1 1/2009 Reed
7,487,543 B2 2/2009 Arnold et al.
7,496,960 B1 2/2009 Chen et al.
7,496,961 B2 2/2009 Zimmer et al.
7,519,990 B1 4/2009 Xie
7,523,493 B2 4/2009 Liang et al.
7,530,104 B1 5/2009 Thrower et al.
7,540,025 B2 5/2009 Tzadikario
7,546,638 B2 6/2009 Anderson et al.
7,565,550 B2 7/2009 Liang et al.
7,568,233 B1 7/2009 Szor et al.
7,584,455 B2 9/2009 Ball
7,603,715 B2 10/2009 Costa et al.
7,607,171 B1 10/2009 Marsden et al.
7,639,714 B2 12/2009 Stolfo et al.
7,644,441 B2 1/2010 Schmid et al.
7,657,419 B2 2/2010 Van der Made
7,676,841 B2 3/2010 Sobchuk et al.
7,698,548 B2 4/2010 Shelest et al.
7,707,633 B2 4/2010 Danford et al.
7,712,136 B2 5/2010 Sprosts et al.
7,730,011 B1 6/2010 Deninger et al.
7,739,740 B1 6/2010 Nachenberg et al.
7,779,463 B2 8/2010 Stolfo et al.
7,784,097 B1 8/2010 Stolfo et al.
7,832,008 B1 11/2010 Kraemer
7,836,502 B1 11/2010 Zhao et al.
7,849,506 B1 12/2010 Dansey et al.
7,854,007 B2 12/2010 Sprosts et al.
7,869,073 B2 1/2011 Oshima
7,877,803 B2 1/2011 Enstone et al.
7,904,959 B2 3/2011 Sidiroglou et al.
7,908,660 B2 3/2011 Bahl
7,930,738 B1 4/2011 Petersen
7,937,387 B2 5/2011 Frazier et al.
7,937,761 B1 5/2011 Bennett
7,949,849 B2 5/2011 Lowe et al.
7,996,556 B2 8/2011 Raghavan et al.
7,996,836 B1 8/2011 McCorkendale et al.
7,996,904 B1 8/2011 Chiueh et al.
7,996,905 B2 8/2011 Arnold et al.
8,006,305 B2 8/2011 Aziz
8,010,667 B2 8/2011 Zhang et al.
8,020,206 B2 9/2011 Hubbard et al.
8,021,184 B1 9/2011 Patten, Jr.
8,028,338 B1 9/2011 Schneider et al.
8,045,094 B2 10/2011 Teragawa
8,045,458 B2 10/2011 Alperovitch et al.
8,069,484 B2 11/2011 McMillan et al.
8,087,086 B1 12/2011 Lai et al.
8,171,553 B2 5/2012 Aziz et al.
8,176,049 B2 5/2012 Deninger et al.
8,176,480 B1 5/2012 Spertus
8,201,246 B1 6/2012 Wu et al.
8,204,984 B1 6/2012 Aziz et al.
8,214,905 B1 7/2012 Doukhvalov et al.
8,220,055 B1 7/2012 Kennedy
8,225,288 B2 7/2012 Miller et al.
8,225,373 B2 7/2012 Kraemer
8,233,882 B2 7/2012 Rogel
8,234,640 B1 7/2012 Fitzgerald et al.
8,234,709 B2 7/2012 Viljoen et al.
8,239,944 B1 8/2012 Nachenberg et al.
8,260,914 B1 9/2012 Ranjan
8,266,091 B1 9/2012 Gubin et al.
8,286,251 B2 10/2012 Eker et al.
8,291,499 B2 10/2012 Aziz et al.
8,307,435 B1 11/2012 Mann et al.
8,307,443 B2 11/2012 Wang et al.
8,312,545 B2 11/2012 Tuvell et al.
8,321,936 B1 11/2012 Green et al.
8,321,941 B2 11/2012 Tuvell et al.
8,332,571 B1 12/2012 Edvards, Sr.
8,365,286 B2 1/2013 Poston
8,365,297 B1 1/2013 Parshin et al.
8,370,938 B1 2/2013 Daswani et al.
8,370,939 B2 2/2013 Zaitsev et al.
8,375,444 B2 2/2013 Aziz et al.
8,381,299 B2 2/2013 Stolfo et al.
8,402,529 B1 3/2013 Green et al.

(56) References Cited

U.S. PATENT DOCUMENTS 8,464,340 B2 6/2013 Ahn et al.
8,479,174 B2 7/2013 Chiriac
8,479,276 B1 7/2013 Vaystikh et al.
8,479,291 B1 7/2013 Bodke
8,510,827 B1 8/2013 Leake et al.
8,510,828 B1 8/2013 Guo et al.
8,510,842 B2 8/2013 Amit et al.
8,516,478 B1 8/2013 Edwards et al.
8,516,590 B1 8/2013 Ranadive et al.
8,516,593 B2 8/2013 Aziz
8,522,348 B2 8/2013 Chen et al.
8,528,086 B1 9/2013 Aziz
8,533,824 B2 9/2013 Hutton et al.
8,539,582 B1 9/2013 Aziz et al.
8,549,638 B2 10/2013 Aziz
8,555,391 B1 10/2013 Demir et al.
8,561,177 B1 10/2013 Aziz et al.
8,566,476 B2 10/2013 Shiffer et al.
8,566,946 B1 10/2013 Aziz et al.
8,584,094 B2 11/2013 Dadhia et al.
8,584,234 B1 11/2013 Sobel et al.
8,584,239 B2 11/2013 Aziz et al.
8,595,834 B2 11/2013 Xie et al.
8,627,476 B1 1/2014 Satish et al.
8,635,696 B1 1/2014 Aziz
8,682,054 B2 3/2014 Xue et al.
8,682,812 B1 3/2014 Ranjan
8,689,333 B2 4/2014 Aziz
8,695,096 B1 4/2014 Zhang
8,713,631 B1 4/2014 Pavlyushchik
8,713,681 B2 4/2014 Silberman et al.
8,726,392 B1 5/2014 McCorkendale et al.
8,739,280 B2 5/2014 Chess et al.
8,776,229 B1 7/2014 Aziz
8,782,792 B1 7/2014 Bodke
8,789,172 B2 7/2014 Stolfo et al.
8,789,178 B2 7/2014 Kejriwal et al.
8,793,278 B2 7/2014 Frazier et al.
8,793,787 B2 7/2014 Ismael et al.
8,805,947 B1 8/2014 Kuzkin et al.
8,806,647 B1 8/2014 Daswani et al.
8,832,829 B2 9/2014 Manni et al.
8,850,570 B1 9/2014 Ramzan
8,850,571 B2 9/2014 Staniford et al.
8,881,234 B2 11/2014 Narasimhan et al.
8,881,271 B2 11/2014 Butler, II
8,881,282 B1 11/2014 Aziz et al.
8,898,788 B1 11/2014 Aziz et al.
8,935,779 B2 1/2015 Manni et al.
8,949,257 B2 2/2015 Shiffer et al.
8,984,638 B1 3/2015 Aziz et al.
8,990,939 B2 3/2015 Staniford et al.
8,990,944 B1 3/2015 Singh et al.
8,997,219 B2 3/2015 Staniford et al.
9,009,822 B1 4/2015 Ismael et al.
9,009,823 B1 4/2015 Ismael et al.
9,027,135 B1 5/2015 Aziz
9,071,638 B1 6/2015 Aziz et al.
9,104,867 B1 8/2015 Thioux et al.
9,106,630 B2 8/2015 Frazier et al.
9,106,694 B2 8/2015 Aziz et al.
9,118,715 B2 8/2015 Staniford et al.
9,159,035 B1 10/2015 Ismael et al.
9,171,160 B2 10/2015 Vincent et al.
9,176,843 B1 11/2015 Ismael et al.
9,189,627 B1 11/2015 Islam
9,195,829 B1 11/2015 Goradia et al.
9,197,664 B1 11/2015 Aziz et al.
9,223,972 B1 12/2015 Vincent et al.
9,225,740 B1 12/2015 Ismael et al.
9,241,010 B1 1/2016 Bennett et al.
9,251,343 B1 2/2016 Vincent et al.
9,262,635 B2 2/2016 Paithane et al.
9,268,936 B2 2/2016 Butler
9,275,229 B2 3/2016 LeMasters
9,282,109 B1 3/2016 Aziz et al.
9,292,686 B2 3/2016 Ismael et al.
9,294,501 B2 3/2016 Mesdaq et al.
9,300,686 B2 3/2016 Pidathala et al.
9,306,960 B1 4/2016 Aziz
9,306,974 B1 4/2016 Aziz et al.
9,311,479 B1 4/2016 Manni et al.
9,355,247 B1 5/2016 Thioux et al.
9,356,944 B1 5/2016 Aziz
9,363,280 B1 6/2016 Rivlin et al.
9,367,681 B1 6/2016 Ismael et al.
9,398,028 B1 7/2016 Karandikar et al.
9,413,781 B2 8/2016 Cunningham et al.
9,426,071 B1 8/2016 Caldejon et al.
9,430,646 B1 8/2016 Mushtaq et al.
9,432,389 B1 8/2016 Khalid et al.
9,438,613 B1 9/2016 Paithane et al.
9,438,622 B1 9/2016 Staniford et al.
9,438,623 B1 9/2016 Thioux et al.
9,459,901 B2 10/2016 Jung et al.
9,467,460 B1 10/2016 Otvagin et al.
9,483,644 B1 11/2016 Paithane et al.
9,495,180 B2 11/2016 Ismael
9,497,213 B2 11/2016 Thompson et al.
9,507,935 B2 11/2016 Ismael et al.
9,516,057 B2 12/2016 Aziz
9,519,782 B2 12/2016 Aziz et al.
9,536,091 B2 1/2017 Paithane et al.
9,537,972 B1 1/2017 Edwards et al.
9,560,059 B1 1/2017 Islam
9,565,202 B1 2/2017 Kindlund et al.
9,591,015 B1 3/2017 Amin et al.
9,591,020 B1 3/2017 Aziz
9,594,904 B1 3/2017 Jain et al.
9,594,905 B1 3/2017 Ismael et al.
9,594,912 B1 3/2017 Thioux et al.
9,609,007 B1 3/2017 Rivlin et al.
9,626,509 B1 4/2017 Khalid et al.
9,628,498 B1 4/2017 Aziz et al.
9,628,507 B2 4/2017 Haq et al.
9,633,134 B2 4/2017 Ross
9,635,039 B1 4/2017 Islam et al.
9,641,546 B1 5/2017 Manni et al.
9,654,485 B1 5/2017 Neumann
9,661,009 B1 5/2017 Karandikar et al.
9,661,018 B1 5/2017 Aziz
9,674,298 B1 6/2017 Edwards et al.
9,680,862 B2 6/2017 Ismael et al.
9,690,606 B1 6/2017 Ha et al.
9,690,933 B1 6/2017 Singh et al.
9,690,935 B2 6/2017 Shiffer et al.
9,690,936 B1 6/2017 Malik et al.
9,736,179 B2 8/2017 Ismael
9,740,857 B2 8/2017 Ismael et al.
9,747,446 B1 8/2017 Pidathala et al.
9,756,074 B2 9/2017 Aziz et al.
9,773,112 B1 9/2017 Rathor et al.
9,781,144 B1 10/2017 Otvagin et al.
9,787,700 B1 10/2017 Amin et al.
9,787,706 B1 10/2017 Otvagin et al.
9,792,196 B1 10/2017 Ismael et al.
9,824,209 B1 11/2017 Ismael et al.
9,824,211 B2 11/2017 Wilson
9,824,216 B1 11/2017 Khalid et al.
9,825,976 B1 11/2017 Gomez et al.
9,825,989 B1 11/2017 Mehra et al.
9,838,408 B1 12/2017 Karandikar et al.
9,838,411 B1 12/2017 Aziz
9,838,416 B1 12/2017 Aziz
9,838,417 B1 12/2017 Khalid et al.
9,846,776 B1 12/2017 Paithane et al.
9,876,701 B1 1/2018 Caldejon et al.
9,888,016 B1 2/2018 Amin et al.
9,888,019 B1 2/2018 Pidathala et al.
9,910,988 B1 3/2018 Vincent et al.
9,912,644 B2 3/2018 Cunningham
9,912,681 B1 3/2018 Ismael et al.
9,912,684 B1 3/2018 Aziz et al.
9,912,691 B2 3/2018 Mesdaq et al.

(56) References Cited

U.S. PATENT DOCUMENTS 9,912,698 B1 3/2018 Thioux et al.
9,916,440 B1 3/2018 Paithane et al.
9,921,978 B1 3/2018 Chan et al.
9,934,376 B1 4/2018 Ismael
9,934,381 B1 4/2018 Kindlund et al.
9,946,568 B1 4/2018 Ismael et al.
9,954,890 B1 4/2018 Staniford et al.
9,973,531 B1 5/2018 Thioux
10,002,252 B2 6/2018 Ismael et al.
10,019,338 B1 7/2018 Goradia et al.
10,019,573 B2 7/2018 Silberman et al.
10,025,691 B1 7/2018 Ismael et al.
10,025,927 B1 7/2018 Khalid et al.
10,027,689 B1 7/2018 Rathor et al.
10,027,690 B2 7/2018 Aziz et al.
10,027,696 B1 7/2018 Rivlin et al.
10,033,747 B1 7/2018 Paithane et al.
10,033,748 B1 7/2018 Cunningham et al.
10,033,753 B1 7/2018 Islam et al.
10,033,759 B1 7/2018 Kabra et al.
10,050,998 B1 8/2018 Singh
10,068,091 B1 9/2018 Aziz et al.
10,075,455 B2 9/2018 Zafar et al.
10,083,302 B1 9/2018 Paithane et al.
10,084,813 B2 9/2018 Eyada
10,089,461 B1 10/2018 Ha et al.
10,097,573 B1 10/2018 Aziz
10,104,102 B1 10/2018 Neumann
10,108,446 B1 10/2018 Steinberg et al.
10,121,000 B1 11/2018 Rivlin et al.
10,122,746 B1 11/2018 Manni et al.
10,133,863 B2 11/2018 Bu et al.
10,133,866 B1 11/2018 Kumar et al.
10,146,810 B2 12/2018 Shiffer et al.
10,148,693 B2 12/2018 Singh et al.
10,165,000 B1 12/2018 Aziz et al.
10,169,585 B1 1/2019 Pilipenko et al.
10,176,321 B2 1/2019 Abbasi et al.
10,181,029 B1 1/2019 Ismael et al.
10,191,861 B1 1/2019 Sheinberg et al.
10,192,052 B1 1/2019 Singh et al.
10,198,574 B1 2/2019 Thioux et al.
10,200,384 B1 2/2019 Mushtaq et al.
10,210,329 B1 2/2019 Malik et al.
10,216,927 B1 2/2019 Steinberg
10,218,740 B1 2/2019 Mesdaq et al.
10,242,185 B1 3/2019 Goradia
10,623,429 B1 4/2020 Vines et al.
11,031,135 B2 6/2021 Gates et al.
11,258,806 B1 * 2/2022 Berninger ........... H04L 63/1441
12,063,229 B1 * 8/2024 Berninger ........... H04L 63/1441
2001/0005889 A1 6/2001 Albrecht
2001/0047326 A1 11/2001 Broadbent et al.
2002/0018903 A1 2/2002 Kokubo et al.
2002/0091819 A1 7/2002 Melchione et al.
2002/0095607 A1 7/2002 Lin-Hendel
2002/0098430 A1 7/2002 Kawamura et al.
2002/0116627 A1 8/2002 Tarbotton et al.
2002/0144156 A1 10/2002 Copeland
2002/0162015 A1 10/2002 Tang
2002/0166063 A1 11/2002 Lachman et al.
2002/0169952 A1 11/2002 DiSanto et al.
2002/0184528 A1 12/2002 Shevenell et al.
2002/0188887 A1 12/2002 Largman et al.
2002/0194490 A1 12/2002 Halperin et al.
2003/0021728 A1 1/2003 Sharpe et al.
2003/0074578 A1 4/2003 Ford et al.
2003/0084318 A1 5/2003 Schertz
2003/0101381 A1 5/2003 Mateev et al.
2003/0115483 A1 6/2003 Liang et al.
2003/0188190 A1 10/2003 Aaron et al.
2003/0191957 A1 10/2003 Hypponen et al.
2003/0200460 A1 10/2003 Morota et al.
2003/0212902 A1 11/2003 van der Made
2003/0229801 A1 12/2003 Kouznetsov et al.
2003/0237000 A1 12/2003 Denton et al.
2004/0003323 A1 1/2004 Bennett et al.
2004/0006473 A1 1/2004 Mills et al.
2004/0015712 A1 1/2004 Szor
2004/0019832 A1 1/2004 Arnold et al.
2004/0047356 A1 3/2004 Bauer et al.
2004/0083408 A1 4/2004 Spiegel et al.
2004/0088581 A1 5/2004 Brawn et al.
2004/0093513 A1 5/2004 Cantrell et al.
2004/0111531 A1 6/2004 Staniford et al.
2004/0117478 A1 6/2004 Triulzi et al.
2004/0117624 A1 6/2004 Brandt et al.
2004/0128355 A1 7/2004 Chao et al.
2004/0165588 A1 8/2004 Pandya
2004/0236963 A1 11/2004 Danford et al.
2004/0243349 A1 12/2004 Greifeneder et al.
2004/0249911 A1 12/2004 Alkhatib et al.
2004/0255161 A1 12/2004 Cavanaugh
2004/0268147 A1 12/2004 Wiederin et al.
2005/0005159 A1 1/2005 Oliphant
2005/0021740 A1 1/2005 Bar et al.
2005/0033960 A1 2/2005 Vialen et al.
2005/0033989 A1 2/2005 Poletto et al.
2005/0050148 A1 3/2005 Mohammadioun et al.
2005/0086523 A1 4/2005 Zimmer et al.
2005/0091513 A1 4/2005 Mitomo et al.
2005/0091533 A1 4/2005 Omote et al.
2005/0091652 A1 4/2005 Ross et al.
2005/0108562 A1 5/2005 Khazan et al.
2005/0114663 A1 5/2005 Cornell et al.
2005/0125195 A1 6/2005 Brendel
2005/0149726 A1 7/2005 Joshi et al.
2005/0157662 A1 7/2005 Bingham et al.
2005/0183143 A1 8/2005 Anderholm et al.
2005/0201297 A1 9/2005 Peikari
2005/0210533 A1 9/2005 Copeland et al.
2005/0238005 A1 10/2005 Chen et al.
2005/0240781 A1 10/2005 Gassoway
2005/0262562 A1 11/2005 Gassoway
2005/0265331 A1 12/2005 Stolfo
2005/0283839 A1 12/2005 Cowburn
2006/0010495 A1 1/2006 Cohen et al.
2006/0015416 A1 1/2006 Hoffman et al.
2006/0015715 A1 1/2006 Anderson
2006/0015747 A1 1/2006 Van de Ven
2006/0021029 A1 1/2006 Brickell et al.
2006/0021054 A1 1/2006 Costa et al.
2006/0031476 A1 2/2006 Mathes et al.
2006/0047665 A1 3/2006 Neil
2006/0070130 A1 3/2006 Costea et al.
2006/0075496 A1 4/2006 Carpenter et al.
2006/0095968 A1 5/2006 Portolani et al.
2006/0101516 A1 5/2006 Sudaharan et al.
2006/0101517 A1 5/2006 Banzhof et al.
2006/0117385 A1 6/2006 Mester et al.
2006/0123477 A1 6/2006 Raghavan et al.
2006/0143709 A1 6/2006 Brooks et al.
2006/0150249 A1 7/2006 Gassen et al.
2006/0161983 A1 7/2006 Cothrell et al.
2006/0161987 A1 7/2006 Levy-Yurista
2006/0161989 A1 7/2006 Reshef et al.
2006/0164199 A1 7/2006 Glide et al.
2006/0173992 A1 8/2006 Weber et al.
2006/0179747 A1 8/2006 Tran et al.
2006/0184632 A1 8/2006 Marino et al.
2006/0191010 A1 8/2006 Benjamin
2006/0221956 A1 10/2006 Narayan et al.
2006/0236393 A1 10/2006 Kramer et al.
2006/0242709 A1 10/2006 Seinfeld et al.
2006/0248519 A1 11/2006 Jaeger et al.
2006/0248582 A1 11/2006 Panjwani et al.
2006/0251104 A1 11/2006 Koga
2006/0288417 A1 12/2006 Bookbinder et al.
2007/0006288 A1 1/2007 Mayfield et al.
2007/0006313 A1 1/2007 Porras et al.
2007/0011174 A1 1/2007 Takaragi et al.
2007/0016951 A1 1/2007 Piccard et al.
2007/0019286 A1 1/2007 Kikuchi
2007/0033645 A1 2/2007 Jones

(56) References Cited

U.S. PATENT DOCUMENTS

| | | | |
|---|---|---|---|
| 2007/0038943 | A1 | 2/2007 | FitzGerald et al. |
| 2007/0064689 | A1 | 3/2007 | Shin et al. |
| 2007/0074169 | A1 | 3/2007 | Chess et al. |
| 2007/0094730 | A1 | 4/2007 | Bhikkaji et al. |
| 2007/0101435 | A1 | 5/2007 | Konanka et al. |
| 2007/0118855 | A1 | 5/2007 | Jaff et al. |
| 2007/0142030 | A1 | 6/2007 | Sinha et al. |
| 2007/0143827 | A1 | 6/2007 | Nicodemus et al. |
| 2007/0156895 | A1 | 7/2007 | Vuong |
| 2007/0157180 | A1 | 7/2007 | Tillmann et al. |
| 2007/0157306 | A1 | 7/2007 | Elrod et al. |
| 2007/0168988 | A1 | 7/2007 | Eisner et al. |
| 2007/0171824 | A1 | 7/2007 | Ruello et al. |
| 2007/0174915 | A1 | 7/2007 | Gribble et al. |
| 2007/0191500 | A1 | 8/2007 | Lum |
| 2007/0192858 | A1 | 8/2007 | Lum |
| 2007/0198275 | A1 | 8/2007 | Malden et al. |
| 2007/0208822 | A1 | 9/2007 | Wang et al. |
| 2007/0220607 | A1 | 9/2007 | Sprosts et al. |
| 2007/0240218 | A1 | 10/2007 | Tuvell et al. |
| 2007/0240219 | A1 | 10/2007 | Tuvell et al. |
| 2007/0240220 | A1 | 10/2007 | Tuvell et al. |
| 2007/0240222 | A1 | 10/2007 | Tuvell et al. |
| 2007/0245417 | A1 | 10/2007 | Lee et al. |
| 2007/0250930 | A1 | 10/2007 | Aziz et al. |
| 2007/0256132 | A2 | 11/2007 | Oliphant |
| 2007/0271446 | A1 | 11/2007 | Nakamura |
| 2008/0005782 | A1 | 1/2008 | Aziz |
| 2008/0018122 | A1 | 1/2008 | Zierler et al. |
| 2008/0028463 | A1 | 1/2008 | Dagon et al. |
| 2008/0040710 | A1 | 2/2008 | Chiriac |
| 2008/0046781 | A1 | 2/2008 | Childs et al. |
| 2008/0066179 | A1 | 3/2008 | Liu |
| 2008/0072326 | A1 | 3/2008 | Danford |
| 2008/0077793 | A1 | 3/2008 | Tan et al. |
| 2008/0080518 | A1 | 4/2008 | Hoeflin et al. |
| 2008/0086720 | A1 | 4/2008 | Lekel |
| 2008/0098476 | A1 | 4/2008 | Syversen |
| 2008/0120722 | A1 | 5/2008 | Sima et al. |
| 2008/0134178 | A1 | 6/2008 | Fitzgerald et al. |
| 2008/0134334 | A1 | 6/2008 | Kim et al. |
| 2008/0141376 | A1 | 6/2008 | Clausen et al. |
| 2008/0184367 | A1 | 7/2008 | McMillan et al. |
| 2008/0184373 | A1 | 7/2008 | Traut et al. |
| 2008/0189787 | A1 | 8/2008 | Arnold et al. |
| 2008/0201778 | A1 | 8/2008 | Guo et al. |
| 2008/0209557 | A1 | 8/2008 | Herley et al. |
| 2008/0215742 | A1 | 9/2008 | Goldszmidt et al. |
| 2008/0222729 | A1 | 9/2008 | Chen et al. |
| 2008/0263665 | A1 | 10/2008 | Ma et al. |
| 2008/0295172 | A1 | 11/2008 | Bohacek |
| 2008/0301810 | A1 | 12/2008 | Lehane et al. |
| 2008/0307524 | A1 | 12/2008 | Singh et al. |
| 2008/0313738 | A1 | 12/2008 | Enderby |
| 2008/0320594 | A1 | 12/2008 | Jiang |
| 2009/0003317 | A1 | 1/2009 | Kasralikar et al. |
| 2009/0007100 | A1 | 1/2009 | Field et al. |
| 2009/0013408 | A1 | 1/2009 | Schipka |
| 2009/0031423 | A1 | 1/2009 | Liu et al. |
| 2009/0036111 | A1 | 2/2009 | Danford et al. |
| 2009/0037835 | A1 | 2/2009 | Goldman |
| 2009/0044024 | A1 | 2/2009 | Oberheide et al. |
| 2009/0044274 | A1 | 2/2009 | Budko et al. |
| 2009/0064332 | A1 | 3/2009 | Porras et al. |
| 2009/0077666 | A1 | 3/2009 | Chen et al. |
| 2009/0083369 | A1 | 3/2009 | Marmor |
| 2009/0083855 | A1 | 3/2009 | Apap et al. |
| 2009/0089879 | A1 | 4/2009 | Wang et al. |
| 2009/0094697 | A1 | 4/2009 | Provos et al. |
| 2009/0113425 | A1 | 4/2009 | Ports et al. |
| 2009/0125976 | A1 | 5/2009 | Wassermann et al. |
| 2009/0126015 | A1 | 5/2009 | Monastyrsky et al. |
| 2009/0126016 | A1 | 5/2009 | Sobko et al. |
| 2009/0133125 | A1 | 5/2009 | Choi et al. |
| 2009/0144823 | A1 | 6/2009 | Lamastra et al. |
| 2009/0158430 | A1 | 6/2009 | Borders |
| 2009/0172815 | A1 | 7/2009 | Gu et al. |
| 2009/0187992 | A1 | 7/2009 | Poston |
| 2009/0193293 | A1 | 7/2009 | Stolfo et al. |
| 2009/0198651 | A1 | 8/2009 | Shiffer et al. |
| 2009/0198670 | A1 | 8/2009 | Shiffer et al. |
| 2009/0198689 | A1 | 8/2009 | Frazier et al. |
| 2009/0199274 | A1 | 8/2009 | Frazier et al. |
| 2009/0199296 | A1 | 8/2009 | Xie et al. |
| 2009/0228233 | A1 | 9/2009 | Anderson et al. |
| 2009/0241187 | A1 | 9/2009 | Troyansky |
| 2009/0241190 | A1 | 9/2009 | Todd et al. |
| 2009/0265692 | A1 | 10/2009 | Godefroid et al. |
| 2009/0271867 | A1 | 10/2009 | Zhang |
| 2009/0300415 | A1 | 12/2009 | Zhang et al. |
| 2009/0300761 | A1 | 12/2009 | Park et al. |
| 2009/0328185 | A1 | 12/2009 | Berg et al. |
| 2009/0328221 | A1 | 12/2009 | Blumfield et al. |
| 2010/0005146 | A1 | 1/2010 | Drako et al. |
| 2010/0011205 | A1 | 1/2010 | McKenna |
| 2010/0017546 | A1 | 1/2010 | Poo et al. |
| 2010/0030996 | A1 | 2/2010 | Butler, II |
| 2010/0031353 | A1 | 2/2010 | Thomas et al. |
| 2010/0037314 | A1 | 2/2010 | Perdisci et al. |
| 2010/0043073 | A1 | 2/2010 | Kuwamura |
| 2010/0054278 | A1 | 3/2010 | Stolfo et al. |
| 2010/0058474 | A1 | 3/2010 | Hicks |
| 2010/0064044 | A1 | 3/2010 | Nonoyama |
| 2010/0077481 | A1 | 3/2010 | Polyakov et al. |
| 2010/0083376 | A1 | 4/2010 | Pereira et al. |
| 2010/0115621 | A1 | 5/2010 | Staniford et al. |
| 2010/0132038 | A1 | 5/2010 | Zaitsev |
| 2010/0154056 | A1 | 6/2010 | Smith et al. |
| 2010/0180344 | A1 | 7/2010 | Malyshev et al. |
| 2010/0192223 | A1 | 7/2010 | Ismael et al. |
| 2010/0220863 | A1 | 9/2010 | Dupaquis et al. |
| 2010/0235831 | A1 | 9/2010 | Dittmer |
| 2010/0251104 | A1 | 9/2010 | Massand |
| 2010/0281102 | A1 | 11/2010 | Chinta et al. |
| 2010/0281541 | A1 | 11/2010 | Stolfo et al. |
| 2010/0281542 | A1 | 11/2010 | Stolfo et al. |
| 2010/0287260 | A1 | 11/2010 | Peterson et al. |
| 2010/0299754 | A1 | 11/2010 | Amit et al. |
| 2010/0306173 | A1 | 12/2010 | Frank |
| 2011/0004737 | A1 | 1/2011 | Greenebaum |
| 2011/0025504 | A1 | 2/2011 | Lyon et al. |
| 2011/0041179 | A1 | 2/2011 | Stahlberg |
| 2011/0047594 | A1 | 2/2011 | Mahaffey et al. |
| 2011/0047620 | A1 | 2/2011 | Mahaffey et al. |
| 2011/0055907 | A1 | 3/2011 | Narasimhan et al. |
| 2011/0078794 | A1 | 3/2011 | Manni et al. |
| 2011/0093951 | A1 | 4/2011 | Aziz |
| 2011/0099620 | A1 | 4/2011 | Stavrou et al. |
| 2011/0099633 | A1 | 4/2011 | Aziz |
| 2011/0099635 | A1 | 4/2011 | Silberman et al. |
| 2011/0113231 | A1 | 5/2011 | Kaminsky |
| 2011/0145918 | A1 | 6/2011 | Jung et al. |
| 2011/0145920 | A1 | 6/2011 | Mahaffey et al. |
| 2011/0145934 | A1 | 6/2011 | Abramovici et al. |
| 2011/0167493 | A1 | 7/2011 | Song et al. |
| 2011/0167494 | A1 | 7/2011 | Bowen et al. |
| 2011/0173213 | A1 | 7/2011 | Frazier et al. |
| 2011/0173460 | A1 | 7/2011 | Ito et al. |
| 2011/0219449 | A1 | 9/2011 | St. Neitzel et al. |
| 2011/0219450 | A1 | 9/2011 | McDougal et al. |
| 2011/0225624 | A1 | 9/2011 | Sawhney et al. |
| 2011/0225655 | A1 | 9/2011 | Niemela et al. |
| 2011/0247072 | A1 | 10/2011 | Staniford et al. |
| 2011/0265182 | A1 | 10/2011 | Peinado et al. |
| 2011/0289582 | A1 | 11/2011 | Kejriwal et al. |
| 2011/0302587 | A1 | 12/2011 | Nishikawa et al. |
| 2011/0307954 | A1 | 12/2011 | Melnik et al. |
| 2011/0307955 | A1 | 12/2011 | Kaplan et al. |
| 2011/0307956 | A1 | 12/2011 | Yermakov et al. |
| 2011/0314546 | A1 | 12/2011 | Aziz et al. |
| 2012/0023593 | A1 | 1/2012 | Puder et al. |
| 2012/0054869 | A1 | 3/2012 | Yen et al. |
| 2012/0066698 | A1 | 3/2012 | Yanoo |
| 2012/0079596 | A1 | 3/2012 | Thomas et al. |

(56) References Cited

U.S. PATENT DOCUMENTS

2012/0084859 A1 4/2012 Radinsky et al.
2012/0096553 A1 4/2012 Srivastava et al.
2012/0110667 A1 5/2012 Zubrilin et al.
2012/0117652 A1 5/2012 Manni et al.
2012/0121154 A1 5/2012 Xue et al.
2012/0124426 A1 5/2012 Maybee et al.
2012/0174186 A1 7/2012 Aziz et al.
2012/0174196 A1 7/2012 Bhogavilli et al.
2012/0174218 A1 7/2012 McCoy et al.
2012/0198279 A1 8/2012 Schroeder
2012/0210423 A1 8/2012 Friedrichs et al.
2012/0222121 A1 8/2012 Staniford et al.
2012/0255015 A1 10/2012 Sahita et al.
2012/0255017 A1 10/2012 Sallam
2012/0260342 A1 10/2012 Dube et al.
2012/0266244 A1 10/2012 Green et al.
2012/0278886 A1 11/2012 Luna
2012/0297489 A1 11/2012 Dequevy
2012/0330801 A1 12/2012 McDougal et al.
2012/0331553 A1 12/2012 Aziz et al.
2013/0014259 A1 1/2013 Gribble et al.
2013/0036472 A1 2/2013 Aziz
2013/0047257 A1 2/2013 Aziz
2013/0074185 A1 3/2013 McDougal et al.
2013/0086684 A1 4/2013 Mohler
2013/0097699 A1 4/2013 Balupari et al.
2013/0097706 A1 4/2013 Titonis et al.
2013/0111587 A1 5/2013 Goel et al.
2013/0117852 A1 5/2013 Stute
2013/0117855 A1 5/2013 Kim et al.
2013/0139264 A1 5/2013 Brinkley et al.
2013/0160125 A1 6/2013 Likhachev et al.
2013/0160127 A1 6/2013 Jeong et al.
2013/0160130 A1 6/2013 Mendelev et al.
2013/0167236 A1 6/2013 Sick
2013/0169131 A1 7/2013 Hu
2013/0174214 A1 7/2013 Duncan
2013/0185789 A1 7/2013 Hagiwara et al.
2013/0185795 A1 7/2013 Winn et al.
2013/0185798 A1 7/2013 Saunders et al.
2013/0191915 A1 7/2013 Antonakakis et al.
2013/0196649 A1 8/2013 Paddon et al.
2013/0227691 A1 8/2013 Aziz et al.
2013/0246370 A1 9/2013 Bartram et al.
2013/0247186 A1 9/2013 LeMasters
2013/0263260 A1 10/2013 Mahaffey et al.
2013/0291109 A1 10/2013 Staniford et al.
2013/0298243 A1 11/2013 Kumar et al.
2013/0318038 A1 11/2013 Shiffer et al.
2013/0318073 A1 11/2013 Shiffer et al.
2013/0325791 A1 12/2013 Shiffer et al.
2013/0325792 A1 12/2013 Shiffer et al.
2013/0325871 A1 12/2013 Shiffer et al.
2013/0325872 A1 12/2013 Shiffer et al.
2014/0032875 A1 1/2014 Butler
2014/0053260 A1 2/2014 Gupta et al.
2014/0053261 A1 2/2014 Gupta et al.
2014/0130158 A1 5/2014 Wang et al.
2014/0137180 A1 5/2014 Lukacs et al.
2014/0169762 A1 6/2014 Ryu
2014/0179360 A1 6/2014 Jackson et al.
2014/0181131 A1 6/2014 Ross
2014/0189687 A1 7/2014 Jung et al.
2014/0189866 A1 7/2014 Shiffer et al.
2014/0189882 A1 7/2014 Jung et al.
2014/0237600 A1 8/2014 Silberman et al.
2014/0280245 A1 9/2014 Wilson
2014/0283037 A1 9/2014 Sikorski et al.
2014/0283063 A1 9/2014 Thompson et al.
2014/0328204 A1 11/2014 Klotsche et al.
2014/0337836 A1 11/2014 Ismael et al.
2014/0344926 A1 11/2014 Cunningham et al.
2014/0351935 A1 11/2014 Shao et al.
2014/0380473 A1 12/2014 Bu et al.
2014/0380474 A1 12/2014 Paithane et al.
2015/0007312 A1 1/2015 Pidathala et al.
2015/0096022 A1 4/2015 Vincent et al.
2015/0096023 A1 4/2015 Mesdaq et al.
2015/0096024 A1 4/2015 Haq et al.
2015/0096025 A1 4/2015 Ismael
2015/0180886 A1 6/2015 Staniford et al.
2015/0186645 A1 7/2015 Aziz et al.
2015/0199513 A1 7/2015 Ismael et al.
2015/0199531 A1 7/2015 Ismael et al.
2015/0199532 A1 7/2015 Ismael et al.
2015/0220735 A1 8/2015 Paithane et al.
2015/0371044 A1* 12/2015 Horne .................. G06F 21/577 726/25
2015/0372980 A1 12/2015 Eyada
2015/0373043 A1 12/2015 Wang et al.
2016/0004869 A1 1/2016 Ismael et al.
2016/0006756 A1 1/2016 Ismael et al.
2016/0044000 A1 2/2016 Cunningham
2016/0127393 A1 5/2016 Aziz et al.
2016/0191547 A1 6/2016 Zafar et al.
2016/0191550 A1 6/2016 Ismael et al.
2016/0261612 A1 9/2016 Mesdaq et al.
2016/0285914 A1 9/2016 Singh et al.
2016/0301703 A1 10/2016 Aziz
2016/0335110 A1 11/2016 Paithane et al.
2016/0359740 A1* 12/2016 Parandehgheibi ...... H04L 69/22
2017/0083703 A1 3/2017 Abbasi et al.
2018/0013770 A1 1/2018 Ismael
2018/0048660 A1 2/2018 Paithane et al.
2018/0115574 A1 4/2018 Ridley
2018/0121316 A1 5/2018 Ismael et al.
2018/0288077 A1 10/2018 Siddiqui et al.
2018/0302423 A1* 10/2018 Muddu ................ G06F 16/285

FOREIGN PATENT DOCUMENTS

WO WO 0206928 1/2002
WO WO 0223805 3/2002
WO WO 2007/117636 10/2007
WO WO 2008/041950 4/2008
WO WO 2011/084431 7/2011
WO WO 2011/112348 9/2011
WO WO 2012/075336 6/2012
WO WO 2012/145066 10/2012
WO WO 2013/067505 5/2013

OTHER PUBLICATIONS

Adetoye et al., "Network Intrusion Detection and Active Response System", Department of Computer Science, University College London Gower Street, London, ("Adetoye"), (Sep. 2003).

Apostolopoulos et al., "V-eM: A Cluster of Virtual Machines for Robust, Detailed, and High-Performance Network Emulation", Fourteenth Institute of Electrical and Electronics Engineers International Symposium on Modeling, Analysis, and Simulation of Computer and Telecommunication Systems, Monterey, California, United States, Sep. 11-14, 2006, pp. 117-126.

Aura et al., "Scanning Electronic Documents for Personally Identifiable Information", Fifth Association for Computing Machinery Workshop on Privacy in Electronic Society, Alexandria, Virginia, United States, Oct. 30, 2006, pp. 41-50.

Baecher et al., "The Nepenthes Platform: An Efficient Approach to Collect Malware", Springer-Verlag Berlin Heidelberg, 2006, pp. 165-184.

Bayer et al., "Dynamic Analysis of Malicious Code", Journal in Computer Virology, Springer-Verlag, France, 2006, pp. 66-77.

Chaudet et al., "Optimal Positioning of Active and Passive Monitoring Devices", 2005 Association for Computing Machinery Conference on Emerging Network Experiment and Technology, Toulouse, France, Oct. 24-27, 2005, pp. 71-82.

Chen et al., "When Virtual is Better Than Real, Department of Electrical Engineering and Computer Science", University of Michigan ("Chen") (2001).

Chen et al., "When Virtual is Better than Real", Eighth Workshop on Hot Topics in Operating Systems, Elmau, Germany, May 20-21, 2001, 6 pages.

(56) References Cited

OTHER PUBLICATIONS

Christodorescu et al., "Mining Specification of Malicious Behavior", Joint Eleventh European Software Engineering Conference, Dubrovnik, Croatia, Sep. 3-7, 2007, pp. 5-14.
Cisco "Intrusion Prevention for the Cisco ASA 5500-x Series" Data Sheet.
Cohen, "PyFlag—An Advanced Network Forensic Framework ", Digital Investigation, vol. 5, Elsevier, Sep. 2008, pp. S112-S120.
Costa et al., "Vigilante: End-to-End Containment of Internet Worm Epidemics", Association for Computing Machinery Transactions on Computer Science, vol. 26, Issue 4, 2008, pp. 1-68.
Distler, "Malware Analysis: An Introduction", SNAS Institute InfoSec Reading Room, SANS Institute, 2007.
Dunlap et al., "ReVirt: Enabling Intrusion Analysis through Virtual-Machine Logging and Replay", Fifth Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Getov "Security as a Service in Smart Clouds—Opportunities and Concerns", Computer Software and Applications Conference (COMPSAC). 2012 Institute of Electrical and Electronics Engineers Thirty-sixth International Conference on Computer Software and Applications, Izmir, Turkey, Jul. 16-20, 2012, 7 pages.
Goel et al., Reconstructing System State for Intrusion Analysis, Apr. 2008 SIGOPS Operating Systems Review, vol. 42, Issue 3, 2008, pp. 21-28.
Idika et al., A-Survey-of-Malware-Detection-Techniques, Feb. 2, 2007, Department of Computer Science, Perdue University.
Isohara et al., "Kernel-Based Behavior Analysis for Android Malware Detection", 2011 Seventh International Conference on Computational Intelligence and Security, Sanya, China, Dec. 3-4, 2011, pp. 1011-1015.
Kaeo, "Designing Network Security", ("Kaeo"), (Nov. 2003).
Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jan. 1, 2016].
Kim et al., "Autograph: Toward Automated, Distributed Worm Signature Detection", Thirteenth USENIX Security Symposium, San Diego, California, United States, Aug. 9-13, 2004, pp. 271-286.
King et al., "Operating System Support for Virtual Machines", ("King"), (2003).
Kreibich et al., "Honeycomb-Creating Intrusion Detection Signatures Using Honeypots", Second Workshop on Hot Topics in Networks (HotNets-11), Boston, Massachusetts, United States, (2003).
Kristoff, "Botnets, Detection and Mitigation: DNS-Based Techniques", NU Security Day, (2-5), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, Sixteenth Institute of Electrical and Electronics Engineers International Conference on Parallel and Distributed Systems, pp. 706-711.
Lindorfer et al., "Detecting Environment-Sensitive Malware." Recent Advances in Intrusion Detection. Springer Berlin Heidelberg, 2011.
Marchette "Computer Intrusion Detection and Network Monitoring: A Statistical Viewpoint", ("Marchette"), (2001).
Moore et al., "Internet Quarantine: Requirements for Containing Self-Propagating Code", INFOCOM, vol. 3, (Mar. 30-Apr. 3, 2003), pp. 1901-1910.
Morales et al., "Analyzing and Exploiting Network Behaviors of Malware", Security and Privacy in Communication Networks. Springer Berlin Heidelberg, 2010. Pages 20-34.
Mori, Detecting Unknown Computer Viruses, 2004, Springer-Verlag Berlin Heidelberg.
Natvig "SANDBOXII: Internet", Virus Bulletin Conference, ("Natvig"), (Sep. 2002).
NetBIOS Working Group. Protocol Standard for a NetBIOS Service on a TCP/UDP Transport: Concepts and Methods. STD 19, RFC 1001, Mar. 1987.
NetDetector, "Network Security: NetDetector-Network Intrusion Forensic System (NIFS) Whitepaper", NetDetector Whitepaper, 2003.
Newsome et al., "Dynamic Taint Analysis for Automatic Detection, Analysis, and Signature Generation of Exploits on Commodity Software", Twelfth Annual Network and Distributed System Security, Symposium (NDSS '05), (Feb. 2005).
Nojiri et al., "Cooperation Response Strategies for Large Scale Attack Mitigation", DARPA Information Survivability Conference and Exposition, vol. 1, (Apr. 22-24, 2003), pp. 293-302.
Oberheide et al., "CloudAV.sub. N-Version Antivirus in the Network Cloud", Seventeenth USENIX Security '08 Jul. 28-Aug. 1, 2008, San Jose, California, United States.
Roundy et al., "Hybrid Analysis and Control of Malware", Sep. 15, 2010, Recent Advances in Intrusion Detection, Springer Berlin Heidelberg, Berlin, Heidelberg, pp. 317-338,.
Sailer et al., "sHype: Secure Hypervisor Approach to Trusted Virtualized Systems" (Feb. 2, 2005) ("Sailer").
Salah et al., "Using Cloud Computing to Implement a Security Overlay Network", Institute of Electrical and Electronics Engineers Security & Privacy, vol. 11, No. 1, Jan. 2013, pp. 44-53.
Seclists.org, "SecLists.Org Security Mailing List Archive", Jun. 5, 2003, http://seclists.org/honeypots/2003/q2/319("Boubalos"), 4 pages.
Shinotsuka, Malware Authors Using New Techniques to Evade Automated Threat Analysis Systems, Oct. 26, 2012, http://www.symantec.com/connect/blogs/, pp. 1-4.
Silicon Defense, "Worm Containment in the Internal Network", (Mar. 2003), pp. 1-25.
Singh et al., "Automated Worm Fingerprinting", ACM/USENIX Symposium on Operating System Design and Implementation, San Francisco, California, (Dec. 2004).
Stevens, "Malicious PDF Documents Explained", Institute of Electrical and Electronics Engineers Security and Privacy, vol. 9, Issue 1, 2011, pp. 80-82.
Thomas H. Ptacek (or rn), "Insertion, Evasion, and Denial of Service: Eluding Network Intrusion Detection", Secure Networks, ("Ptacek"), (Jan. 1998).
U.S. Appl. No. 15/857,467, filed Dec. 28, 2017; Advisory Action dated Aug. 13, 2020.
U.S. Appl. No. 15/857,467, filed Dec. 28, 2017; Final Office Action dated May 29, 2020.
U.S. Appl. No. 15/857,467, filed Dec. 28, 2017; Non-Final Office Action dated Sep. 22, 2020.
U.S. Appl. No. 15/857,467, filed Dec. 28, 2017; Non-Final Office Action dated Nov. 15, 2019.
U.S. Appl. No. 15/857,467, filed Dec. 28, 2017; Notice of Allowance dated Jan. 6, 2021.
Venezia, Paul, "NetDetector Captures Intrusions", InfoWorld Issue 27, ("Venezia"), (Jul. 14, 2003).
Wahid et al., Characterizing the Evolution in Scanning Activity of Suspicious Hosts, Oct. 2009, Third International Conference on Network and System Security, pp. 344-350.
Whyte et al., "DNS-Based Detection of Scanning Works in an Enterprise Network", Twelfth Annual Network and Distributed System Security Symposium, Feb. 2005, 15 pages.
Williamson, Matthrew M. "Throttling Viruses: Restricting Propagation to Defeat Malicious Mobile Code", ACSAC Conference, Las Vegas, Nevada, United States, (Dec. 2002), pp. 1-9.
Yin et al., Capturing System-Wide Information Flow for Malware Detection and Analysis, Research Showcase at CMU, Carnegie Mellon University, 2007.
Yuhei et al., "Memory Behavior-Based Automatic Malware Unpacking in Stealth Debugging Environment", Malicious and Unwanted Software (Malware), 2010 Fifth International Conference on, Institute of Electrical and Electronics Engineers, Piscataway, New Jersey, United States, Oct. 19, 2010, pp. 39-46.
Zhang et al., The Effects of Threading, Infection Time, and Multiple-Attacker Collaboration on Malware Propagation, Sep. 2009, Institute of Electrical and Electronics Engineers Twenty-Eighth International Symposium on Reliable Distributed Systems, pp. 73-82.

* cited by examiner

CONTENT ANALYSIS SYSTEM
MACHINE LEARNING-BASED MODEL
CYBERSECURITY INTELLIGENCE RESOURCE
CYBERSECURITY INTELLIGENCE RESOURCE
DATA STORE
100
110
120
130
130
$135_1$
$135_L$
140
140
$150_1$
$150_L$
160
$160_1$
170
180

140
270
ATTACKER INTELLIGENCE
260
THIRD-PARTY BASED INTELLIGENCE
250
ANALYST-BASED INTELLIGENCE
200
240
INCIDENT INVESTIGATION + RESPONSE INTELLIGENCE
230
NETWORK INTERIOR DETECTION INTELLIGENCE
220
NETWORK PERIPHERY DETECTION INTELLIGENCE
210
130
280
DATA NORMALIZATION LOGIC
110
(CYBERTHREAT) DATA STORE
TO/FROM CONTENT ANALYTIC SYSTEM
120

425
FIRST PORTION
420
SECOND PORTION
DATA STORE
110
430
TEST DATASETS
MODEL GENERATION SUBSYSTEM
410
MODEL
170
MODEL APPLICATION SUBSYSTEM -400-
465
FEATURE-SIMILARITY CONVERSION
320
PROFILE
FIRST ANALYTIC
472
474
SECOND ANALYTIC
475
481
SIMILARITY VALVE AGGREGATION
480
WT
WT
WT
490
482
485
SIMILARITY MATRIX (OUTPUT)
META-INFORMATION
460
CYBERTHREAT ANALYSIS SYSTEM -120-

170
MODEL (WITH CATEGORY WEIGHTING)
MODEL TRAIN/TEST CYCLE
450
TEST SIMILARITY MATRIX
445
442
435
SECOND ANALYTIC
440
MULTI-STEP ANALYSIS
FIRST ANALYTIC
430
MODEL GENERATION SUBSYSTEM -410-
420
425
DATA STORE
110
427
RANDOM SAMPLING
430
TEST DATASETS

| FIRST PROFILE | TF | IDF | TF/IDF VALUE |
| --- | --- | --- | --- |
| INDICIUM 1 | 0.11 | 3.56 | 0.40 |
| INDICIUM 2 | 0.49 | 2.33 | 1.14 |

COSINE SIMILARITY (X,Y) = COS ( θ )
575
P2
P1
θ
577
579
SECOND INDICIA (TERM)
TF-IDF VALUE
1.0
0.5
0.1
0.2
0.3
0.4
FIRST INDICIA (TERM)
TF-IDF VALUE

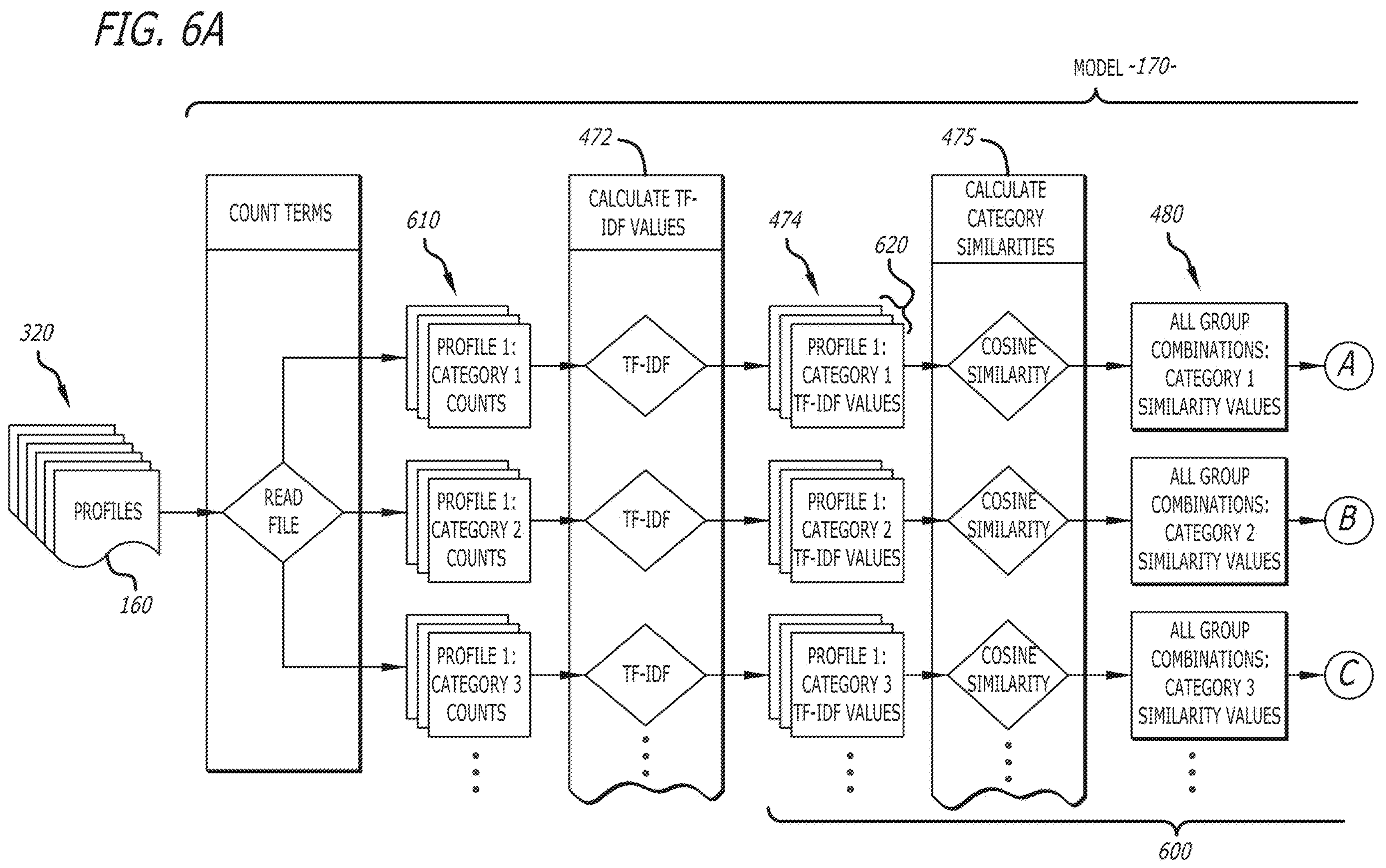
FIG. 6A
MODEL -170-
320
PROFILES
160
COUNT TERMS
READ FILE
610
PROFILE 1: CATEGORY 1 COUNTS
PROFILE 1: CATEGORY 2 COUNTS
PROFILE 1: CATEGORY 3 COUNTS
472
CALCULATE TF-IDF VALUES
TF-IDF
TF-IDF
TF-IDF
474
620
PROFILE 1: CATEGORY 1 TF-IDF VALUES
PROFILE 1: CATEGORY 2 TF-IDF VALUES
PROFILE 1: CATEGORY 3 TF-IDF VALUES
475
CALCULATE CATEGORY SIMILARITIES
COSINE SIMILARITY
COSINE SIMILARITY
COSINE SIMILARITY
480
ALL GROUP COMBINATIONS: CATEGORY 1 SIMILARITY VALUES
ALL GROUP COMBINATIONS: CATEGORY 2 SIMILARITY VALUES
ALL GROUP COMBINATIONS: CATEGORY 3 SIMILARITY VALUES
A
B
C
600

CALCULATE FINAL SIMILARITY
490
CATEGORY 1 WEIGHT
CATEGORY 2 WEIGHT
CATEGORY 3 WEIGHT
A
B
C
+
FINAL GROUP SIMILARITIES (SIMILARITY MATRIX)
485
INTERPRET SIMILARITIES
QUERY LOGIC
620
QUERY RESULTS
640
MERGING CRITERIA
MERGING LOGIC
630
MERGED GROUPS
650

SYSTEM AND METHOD FOR AUTOMATICALLY ASSOCIATING CYBERSECURITY INTELLIGENCE TO CYBERTHREAT ACTORS

CROSS-REFERENCES TO RELATED APPLICATIONS

The present application is a continuation of U.S. application Ser. No. 17/676,755 having a filing date of Feb. 21, 2022, which is a continuation of U.S. patent application Ser. No. 16/450,579, filed Jun. 24, 2019, now U.S. Pat. No. 11,258,806, issued Feb. 22, 2022, the entire contents of which are incorporated by reference herein. Applicant claims priority to and the benefit of each of such applications and incorporate all such applications herein by reference in its entirety.

FIELD

Embodiments of the disclosure relate to the field of cybersecurity. More specifically, one embodiment of the disclosure relates to a cyberthreat analysis system that is configured to automatically analyze and associate cyberthreats, and in particular cybersecurity intelligence representative of the cyberthreats, with existing or new cyberthreat actor groups.

GENERAL BACKGROUND

Cybersecurity threats (referred to as "cyberthreats") have become a pervasive problem for organizations as many networked devices and other resources have been subjected to attack and compromised. A cyberthreat constitutes an actual cyberattack on or a potential threat to the security of stored or in-transit data or of IT infrastructure produced or propagated by a cyberthreat actor group. For example, a cyberthreat may involve a cyberattack directed to the infiltration of content onto a network device, where the content may be a type of executable such as software that is intended to perpetrate malicious or criminal activity. Alternatively, the cyberthreat may involve malicious activities conducted by the cyberthreat actor group, without placement of malicious content onto the network device, in order to harm or co-opt operations of that network device or exfiltrate sensitive information from the network.

A "cyberthreat actor group" may include an individual cyberthreat actor or multiple (e.g., two or more) cyberthreat actors, where a "cyberthreat actor" is generally considered to be a person or entity operating as a nation-state attacker or a financially motivated attacker. The investigations conducted on each cyberthreat may uncover information that indicate activities, infrastructure, and/or malware that may be part of an intrusion, campaign, or other series of related actions that constitute a cyberattack. Identifying cyberthreat actor groups from this information has been extremely challenging due to the large amount of information that must be evaluated in order to identify a cyberthreat actor group with a high level of confidence. Additionally, the difficulty of discovering and investigating potential associations between cyberthreat actor groups responsible for different cyberthreats has increased as the amount of information to evaluate has increased.

Each year, a vast amount of cybersecurity intelligence is gathered by cybersecurity service providers based on hundreds of investigations and thousands of hours of analytics. The cybersecurity intelligence includes content pertaining to investigated cyberthreats, cyberthreats still under investigation, or a combination thereof. The cybersecurity intelligence may be provided from a number of sources. Currently, this cybersecurity intelligence is analyzed manually by expert human analysts in an attempt to identify cyberthreat actor groups, as each cyberthreat actor group tends to be associated with certain distinct characteristics. Besides the short supply of expert human analysts, this manual identification process is labor and time intensive, as human analysts may take days or weeks before she or he can associate a cluster of cybersecurity intelligence to a particular cyberthreat actor group. Therefore, as the amounts of cybersecurity intelligence (e.g., data about attacker activities) increases, this manual identification scheme does not scale in identifying cyberthreat actors and defending against new attempted cyberattacks.

BRIEF DESCRIPTION OF THE DRAWINGS

Embodiments of the invention are illustrated by way of example and not by way of limitation in the figures of the accompanying drawings, in which like references indicate similar elements and in which:

FIG. 6A-6B are exemplary block diagrams collectively illustrating an operational flow of the cyberthreat analysis system of FIG. 5A.

DETAILED DESCRIPTION

Figure 1:
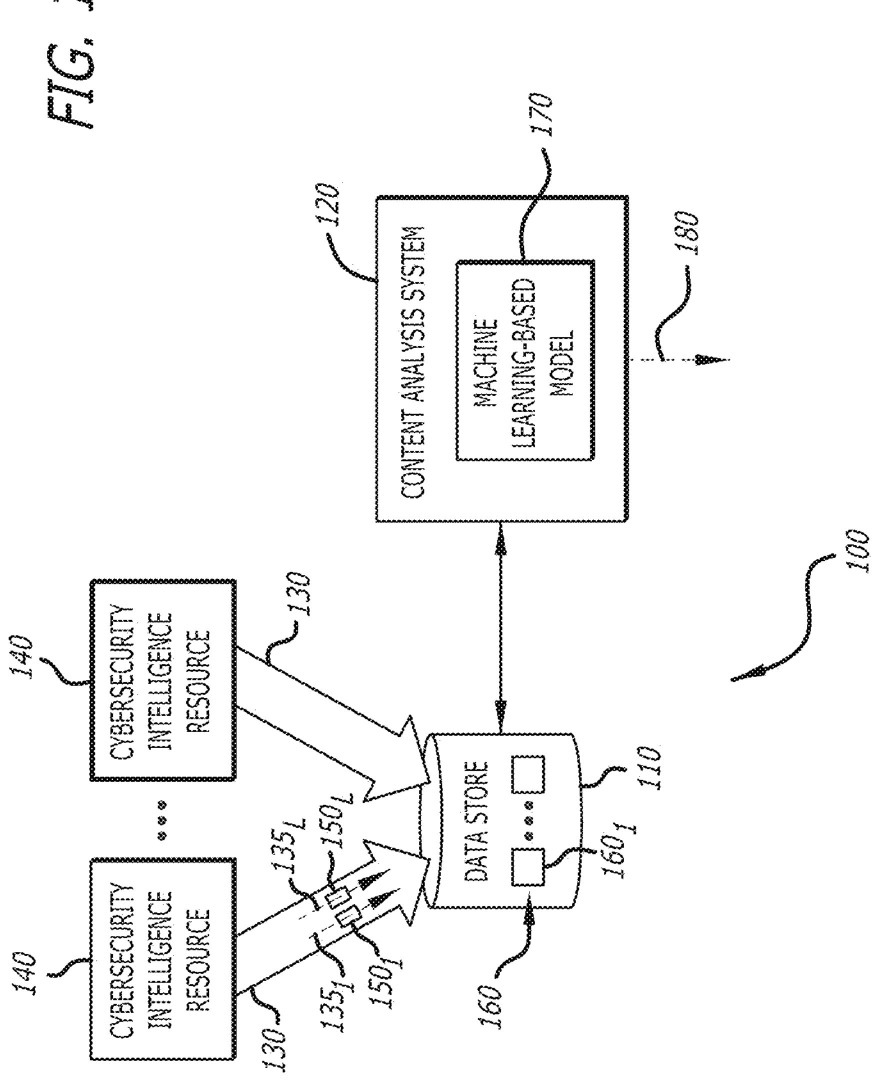
FIG. 1 is an exemplary block diagram of an exemplary embodiment of a cyberthreat actor identification platform including a data store and a cyberthreat analysis system.

Embodiments of the present disclosure generally relate to a cybersecurity threat (cyberthreat) analysis system, operating in accordance with a machine learning-based model, which conducts analytics on content from received cybersecurity intelligence to determine whether the received cybersecurity intelligence can be associated with existing cyberthreat actor groups. Such analytics is conducted to automate presentation of potential associations between unknown and known cyberthreat actor groups to provide greater efficiency in the use of analysts' time. Herein, the cyberthreat analysis system is adapted to utilize the machine learning-based model that optimizes a final modeling step by combining separate similarity values into a single similarity metric, using weightings (coefficients) learned from the machine learning-based model trained on the sampled, test profiles (datasets).

To achieve greater efficiency, a collection of forensically-related indicia (e.g., text consisting of characters, numbers and/or symbols; images, etc.) is obtained from each cluster of cybersecurity intelligence that is associated with a particular cyberthreat. Each indicium constitutes salient information pertaining to a particular type of content within a cybersecurity intelligence cluster (e.g., a malware name, an attacker alias, etc.) and the frequency of occurrence of such information within a cybersecurity intelligence cluster (e.g., a count representing a number of occurrences, etc.).

The forensically-related indicia may be maintained as part of a structured representation of that cybersecurity intelligence cluster, namely a predetermined data structure referred to as a "profile." Within each profile, related indicia may be grouped by category (i.e., indicia within the same category are grouped together). As an illustrative example, the forensically-related indicia may include tactic, technique, and procedure ("TTP") information, and thus, the profile may be structured to support a plurality of categories including, but not limited or restricted to the following categories: (i) known aliases, (ii) malware names, (iii) methods of installation and/or operation for the malware, (iv) targeted industries, (v) targeted countries, or (vi) infrastructure. A profile may be labeled "uncategorized" when the cyberthreat actor group, which is responsible for a cyberthreat to which the cyberthreat intelligence cluster is directed, has not been confirmed. Additionally, a profile may be labeled with a designation for a known cyberthreat actor group upon confirming that the known cyberthreat actor group is responsible for the cyberthreat summarized by the profile (referred to as a "categorized" profile).

Thereafter, in response to a triggering event (e.g., time-based trigger, change in a profile or predetermined number or percentage of profiles, etc.), the machine learning-based model may be updated by conducting analytics on the indicia included within the profiles in order to uncover connections between the actor group responsible for a cyberthreat (as identified by a corresponding cybersecurity intelligence cluster and represented by the profile) and any existing cyberthreat actor groups. Although, as an alternative embodiment, the machine learning-based model may be configured to conduct analytics on larger datasets than the profiles.

More specifically, according to one embodiment of the disclosure, the cybersecurity intelligence may be received from one or more network devices operating as cybersecurity intelligence resource(s) and are stored within a data store. A portion of the cybersecurity intelligence (referred to as a "cybersecurity intelligence cluster") may include content associated with one or more investigations that, over time, may increase in size, especially when the cybersecurity intelligence cluster is associated with an ongoing campaign. As a result, a profile is generated to maintain forensically-related indicia associated with each cybersecurity intelligence cluster and the number of occurrences of each indicium. The categories for indicia to be included in the profiles are determined by analysts as content within cybersecurity intelligence that provides more assistance in identifying cyberthreat actor groups responsible for cyberthreats than other content.

As described below, operating in accordance with the machine learning-based model, the cyberthreat analysis system conducts a multi-step analysis on content within the profiles to determine levels of correlation between the cybersecurity intelligence clusters associated with each of these profiles. For clarity, the operations of the multi-step analysis will be described for a single (first) profile that represents a particular cybersecurity intelligence cluster, albeit these operations may be performed iteratively on the entire corpus of profiles representing the received cybersecurity intelligence. The multi-step analysis is conducted to identify profiles within the corpus of profiles that have similar indicia and/or a determined a level of correlation, and as a result, identifies the cyberthreats represented by these profiles that may have been perpetrated by the same cyberthreat actor group or related cyberthreat actor groups.

For this embodiment of the disclosure, the multi-step analysis involves a first analytic conducted on indicia maintained in each profile category to produce feature vectors for each category. Each feature vector is configured to represent the distinctiveness of indicium within its category. For instance, as an illustrative example, the first analytic may convert each indicium (e.g., term), represented in a first format (e.g., text consisting of characters, numbers and/or symbols) and maintained in a first category of the first profile, into a result having a second format. The result represents the distinctiveness of that term within the first category as well as across the entire corpus of profiles accessible to the cyberthreat analysis system. As an example, the second format may constitute a value within a first prescribed range, where a higher value within the first prescribed range may represent the indicium is more distinctive and better representative content for the cybersecurity intelligence cluster.

Collectively, the results of the first analytic form a feature vector for the first category. Stated differently, where a category of the first profile has a total of "M" distinct terms (where $M \geq 1$), the feature vector for that category-profile combination is now represented as a M-dimensional feature vector. The first analytic is repetitive for each category within the first profile so that a feature vector is generated for each category of the first profile.

Additionally, a second analytic of the multi-step analysis is conducted between the feature vectors associated with each category of the first profile to feature vectors associated with corresponding categories from the other profiles within the corpus of profiles, which may include other "categorized" profiles and/or "uncategorized" profiles. The second analytic is conducted to determine a level of correlation (similarity value) between categories of different profiles, such as the first profile and any categorized or uncategorized profiles within the stored corpus of profiles. This "similarity value" may be represented by a value within a second prescribed range, where a higher value within the second prescribed range represents a higher correlation between features maintained within a specific category. The second analytic is further configured to generate a similarity vector (i.e., a collection of multiple similarity values between the first profile and another profile within the corpus of profiles).

Thereafter, the similarity vector is translated into a single similarity metric, where the above-described operations are conducted iteratively for all of the profiles to form an aggregate of similarity metrics. This aggregate, sometimes referred to as a "similarity matrix," allows an analyst to accurately determine through the generation of displayable or printable results, in real-time, the similarity between at least two profiles such as a reference profile (e.g., the first profile) and one of more other profiles within the corpus of profiles, for example. The displayable or printable results may be presented at a remote or local analyst workstation or console or later included in a variety of displayable or printable (hardcopy) reports. Moreover, the similarity matrix represents levels of correlation between cyberthreat actor groups that are responsible for the cybersecurity intelligence clusters associated with these profiles.

To improve performance, a weighting may be applied to some or all of the similarity values forming the similarity vectors in producing the similarity metric. The weighting is conducted to alter the relevance of certain indicia categories in identifying cyberthreat actor group responsibility based on changes in the threat landscape. Also, by maintaining the results from the first and second analytics, the cyberthreat analysis system may provide visibility as to the level of correlation between features within the profiles being compared as evidence for the conclusions reached by the machine learning-based model.

For instance, based on this determination, the cyberthreat analysis system may be configured to merge together multiple cybersecurity intelligence clusters that appear to be from the same unidentified cyberthreat actor group and update the profile associated with that merged cybersecurity intelligence cluster. Additionally, or in the alternative, the cyberthreat analysis system may be configured to alter the labeling of an uncategorized profile to now represent a new cyberthreat actor group or merge together multiple cybersecurity intelligence clusters that appear to involve the same identified cyberthreat actor group and update the categorized profile with content from the uncategorized profile.

Without a cyberthreat actor identification platform, described below, which analyzes and associates intelligence uncovered during an investigation to identify the cyberthreat actor group associated with the investigation, the number of uncategorized intelligence clusters will increase over time to a level in which they start to become a hindrance or distraction in continued efforts to identify cyberthreat actor groups.

According to one embodiment of the disclosure, the cyberthreat actor identification platform includes a data store and a cyberthreat analysis system. In general, the data store maintains cybersecurity intelligence, where each cybersecurity intelligence cluster may include information directed to an analysis of a cyberthreat (and/or multiple related cyberthreats) by a cybersecurity investigator (e.g., cybersecurity appliance, incident response team, cybersecurity expert, etc.). As an example, a cybersecurity intelligence cluster may include one or more incident response reports that describe the activity associated with a potential breach (e.g., malware type, activity, alias of cyberthreat actor group, targeted company and its industry, network (IP) address for downloaded malware, etc.). As another example, a cybersecurity intelligence cluster may include information associated with a prior analysis of malware or information associated with review of the current threat landscape as offered by cybersecurity investigators, such as observed campaigns or current cyberattack trends for example. The data store may be periodically or extemporaneously updated with cybersecurity intelligence.

The cybersecurity intelligence clusters associated with a particular cyberthreat may be relied upon to generate a profile. As one embodiment, the profile may be constructed to maintain indicia associated with different categories, namely different types of content that are considered to be helpful in determining cyberthreat actor groups. As an illustrative example, the profile may include multiple categories such as (i) actor alias, (ii) malware name (for detected malware belonging to the cyberattack), (iii) methods of installation and/or operation (e.g. spearfishing, powershell, etc.) for detected malware, (iv) targeted industries (e.g., governmental, military, energy, semiconductor, etc.), (v) targeted countries (United States, England, France, etc.), and/or (vi) infrastructure (e.g., communicative information such as Internet Protocol "IP" address, Media Access Control "MAC' address, host address, etc.). The data store is configured to maintain a corpus of profiles, including uncategorized profiles and/or categorized profiles.

According to one embodiment of the disclosure, the cyberthreat analysis system includes a processor and memory, which is configured to store logic for execution by the processor. Examples of the stored logic may include, but is not limited or restricted to model generation subsystem, model application subsystem and reporting subsystem. The model application subsystem further includes content aggregation logic, cyberthreat analytic logic and model optimization logic, as described below.

Herein, according to this embodiment, the model generation subsystem is configured to generate a machine learning-based model supplied to the model application subsystem. The model application subsystem is configured to apply the model to the stored cybersecurity intelligence, namely the corpus of profiles, to evaluate similarities between the stored cybersecurity intelligence. The similarities provide guidance to analysts toward identifying cyberthreat actor groups involved in different cyberthreats as represented by the received cybersecurity intelligence clusters. In particular, for this embodiment, the model is configured to convert content within the corpus of profiles into the similarity matrix (described above), which may be queried by analysts to receive a ranking of profiles than are most similar (i.e., indicia suggests highest potential of the cyberthreat associated with the profile as originating from the same or related cyberthreat actor group). This conversion is accomplished in accordance with the multi-step analysis described herein and illustrated in FIGS. 5A-7.

More specifically, the model generation subsystem is configured to generate a model by analyzing the contents of the data store. In some embodiments, the model generation subsystem accesses a first portion of content maintained within the data store to generate a model and a second portion of content maintained within the data store to verify the generated model. In particular, the model generation subsystem is configured to receive information regarding known cyberthreats (e.g., forensically-related indicia sampled from multiple "categorized" profiles stored within the data store. There is then a sampling of these profiles to produce a number of smaller test profiles (sometimes referred to as "test datasets). According to one embodiment of the disclosure, these test profiles are then processed through the cyberthreat analytic logic described above to create a 'test' similarity matrix, in which some pairs of test profiles are known to be related, and others are known to not be related.

Based on these test profiles, the model may be "tuned" by the model generation subsystem to improve operation by confirming that certain test profiles associated with forensically-related indicia procured from a particular profile, and thus pertaining to a particular known cyberthreat actor group, is determined by the model to be correlated to that known cyberthreat actor group. The tuning may be accomplished by applying the (labeled) test profiles to the model, and through machine learning inference logic (e.g., linear regression or other regression schemes), the weightings to be applied to the similarity metrics is "learned" to improve the accuracy of the model in identifying correct categorized profile associated with the test profiles.

The model application subsystem receives the model generated by the model generation subsystem and applies the corpus of profiles, including the content associated with the "uncategorized" profiles. In particular, the content aggregation logic of the model application subsystem is configured to access information regarding the corpus of profiles (e.g., forensically-related indicia maintained in "categorized" profiles and "uncategorized" profiles) and separate forensically-related indicia associated with each category of the profiles for subsequent processing by the cyberthreat analytic logic. As a result, where each profile is segmented into "N" categories (N≥1, e.g., N=6), the content aggregation logic produces "N" feature groupings of forensically-related indicia, where each "feature grouping" corresponding to a particular category.

Thereafter, the cyberthreat analytic logic is configured to conduct the multi-step analysis on content within the profiles to determine levels of correlation between the cybersecurity intelligence clusters associated with each of these profiles. The multi-step analysis involves a first analytic that is conducted on the first portion of content, namely the forensically-related indicia associated with the "N" categories, to produce "N" feature vectors. Each feature vector includes values associated with each indicium within that profile category. According to one embodiment of the disclosure, each value is generated based on a Term Frequency-Inverse Document Frequency (TF-IDF) conversion technique (described below) to determine which indicia are more important to a determination of a cyberthreat actor group than other indicia. Also, it is contemplated that each cyberthreat actor group and category may be generally represented as a feature vector (or, more generally, a data structure) containing feature scores. Other embodiments for the first analytic may include alternative ranking analysis systems to accomplish similar feature scores.

The cyberthreat analytic logic is further configured to conduct a second analytic on combinations of feature vectors to determine the difference between cyberthreat actor groups. In some embodiments, feature vector similarity may be determined using, for example, Cosine Similarity (described below). Stated differently, the cyberthreat analytic logic is configured to conduct the second analytic on the feature vectors to determine a level of correlation between feature vectors representing categories of different profiles. The level of correlation may be represented by a particular feature score (i.e., similarity value) within the second prescribed range, where a feature score towards the ends of this range identifies higher/lower levels of correlation (e.g., increased/decreased similarity). These similarity values, collectively operating as a similarity vector, may be subsequently used to determine a level of correlation between an identified, cyberthreat actor group associated with a reference profile and one or more cyberthreat actor groups among a corpus of profiles.

Thereafter, the model optimization logic is configured to convert the similarity vectors into the similarity matrix, as described above. According to one embodiment of the disclosure, the model optimization logic may allow for the alteration of the weighting for each of the similarity values, without changes to other model functionality.

Additionally, the model application subsystem further receives information pertaining to an association between a previously uncategorized, cyberthreat actor group and another cyberthreat actor group in order to effectuate a merge (or combination) of cybersecurity intelligence for both actor groups. Based on the merging of the information, the model is regenerated for application to newly received information.

The reporting logic receives information associated with merged cyberthreat actor groups and generates reports (e.g., organized information directed to a "merge" operation or signaling, such as an alert, with information to access the organized information) for further investigation by cyberthreat analysts and/or for alerting cybersecurity investigators and/or administrators. In some embodiments, cybersecurity investigators may receive information associated with newly merged cyberthreat actor groups to assess network and system vulnerability associated with that cyberthreat actor group.

In some embodiments of the invention, the cyberthreat analysis system operating as an analytic tool may be advantageously used by a cybersecurity analyst to aid in the targeted analysis of an unknown cyberthreat actor group to determine if it is part of a particular known cyberthreat actor group.

I. Terminology

In the following description, certain terminology is used to describe aspects of the invention. In certain situations, the terms "logic" and "subsystem" are representative of hardware, firmware, and/or software that is configured to perform one or more functions. As hardware, the logic (or subsystem) may include circuitry having data processing and/or storage functionality. Examples of such circuitry may include, but are not limited or restricted to a processor, a programmable gate array, a microcontroller, an application specific integrated circuit, wireless receiver, transmitter and/or transceiver circuitry, semiconductor memory, or combinatorial logic.

Alternatively, or in combination with hardware circuitry, the logic (or subsystem) may be software in the form of one or more software modules. The software modules may include an executable application, a daemon application, an application programming interface (API), a subroutine, a function, a procedure, an applet, a servlet, a routine, source code, a shared library/dynamic load library, or even one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or subsystem) may be stored in persistent storage.

The term "network device" should be generally construed as physical logic (electronics) or virtualized logic with data processing capability and/or a capability of connecting to any type of network, such as a public network (e.g., internet), a private network (e.g., any type of local area network), a public cloud network (e.g., Amazon Web Service (AWS®), Microsoft Azure®, Google Cloud®, etc.), or a private cloud network. Examples of a network device may include, but are not limited or restricted to, any of the following: a server; a mainframe; a firewall; a data transfer device (e.g., intermediary communication device, router, repeater, portable mobile hotspot, etc.); an endpoint device (e.g., a laptop, a smartphone, a tablet, a desktop computer, a netbook, gaming console, etc.); or a virtual device being software that supports data capture, preliminary analysis of meta-information associated with cybersecurity intelligence.

The term "message" generally refers to signaling (wired or wireless) as either information placed in a prescribed format and transmitted in accordance with a suitable delivery protocol or information made accessible through a logical data structure such as an API. Examples of the delivery protocol include, but are not limited or restricted to HTTP (Hypertext Transfer Protocol); HTTPS (HTTP Secure); Simple Mail Transfer Protocol (SMTP); File Transfer Protocol (FTP); iMESSAGE; Instant Message Access Protocol (IMAP); or the like. Hence, each message may be in the form of one or more packets, frames, or any other series of bits having the prescribed, structured format.

The term "computerized" generally represents that any corresponding operations are conducted by hardware in combination with software and/or firmware.

The term "transmission medium" generally refers to a physical or logical communication link (or path) between two or more network devices. For instance, as a physical communication path, wired and/or wireless interconnects in the form of electrical wiring, optical fiber, cable, bus trace, or a wireless channel using infrared, radio frequency (RF), may be used.

In certain instances, the terms "compare," comparing," "comparison," or other tenses thereof generally mean determining if a match (e.g., identical or a prescribed level of correlation) is achieved between two items where one of the items may include content within meta-information associated with the feature.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

A. Cyberthreat Actor Identification Platform

Referring to FIG. 1, a block diagram of an exemplary embodiment of a cyberthreat actor identification platform (hereinafter, "platform") 100 is shown. Herein, the platform 100 includes at least a data store 110 and a cyberthreat analysis system 120 that is communicatively coupled to the data store 110. The data store 110 is configured to receive cybersecurity intelligence 130 from one or more cybersecurity intelligence resources ("resources") 140. The cybersecurity intelligence 130 includes a plurality of cybersecurity intelligence clusters $\mathbf{135}_1$-$\mathbf{135}_L$ (L≥2), where each cybersecurity intelligence cluster $\mathbf{135}_1$-$\mathbf{135}_L$ may be a collection of intelligence associated with one or more investigations directed toward a particular cyberthreat. For example, a first cybersecurity intelligence cluster $\mathbf{135}_1$ may be an accumulation of evidence acquired from multiple investigations of a cyberthreat campaign or from a single investigation for example. Alternatively, the first cybersecurity intelligence cluster $\mathbf{135}_1$ may be information acquired from one or more prior analyses of malware or information associated with review of the current threat landscape as offered by cybersecurity investigators, such as observed campaigns or current cyberattack trends for example.

Each cybersecurity intelligence cluster $\mathbf{135}_1$ . . . or $\mathbf{135}_L$ may be represented by certain forensically-related indicia $\mathbf{150}_1$ . . . or $\mathbf{150}_L$ contained therein. For this embodiment of the disclosure, the forensically-related indicia $\mathbf{150}_1$ may constitute salient information from a cybersecurity intelligence cluster $\mathbf{135}_1$, where each indicium of the forensically-related indicia $\mathbf{150}_1$ pertains to one of a plurality of content types (categories). A structured representation of the forensically-related indicia 150 (e.g., indicia $\mathbf{150}_1$) associated with a cybersecurity intelligence cluster 135 (e.g., cluster $\mathbf{135}_1$) may be referred to as a "profile" 160 (e.g., profile $\mathbf{160}_1$).

As further shown in FIG. 1, according to one embodiment of the disclosure, the cyberthreat analysis system 120 is configured to generate and/or utilize a machine learning-based model 170. The model 170 is adapted to receive a form of cybersecurity intelligence and provide results 180 based on running the cybersecurity intelligence through the model 170. According to one embodiment of the disclosure, the results may be represented as (i) an organized grouping (i.e. listing) of profiles that are sorted based on levels of correlation (i.e., similarity metrics) computed between a reference profile and the listed profiles, (ii) a listing of profiles that are sorted based on highest levels of correlation with a reference profile, or the like.

B. Cyberthreat Data Store

Figure 2:
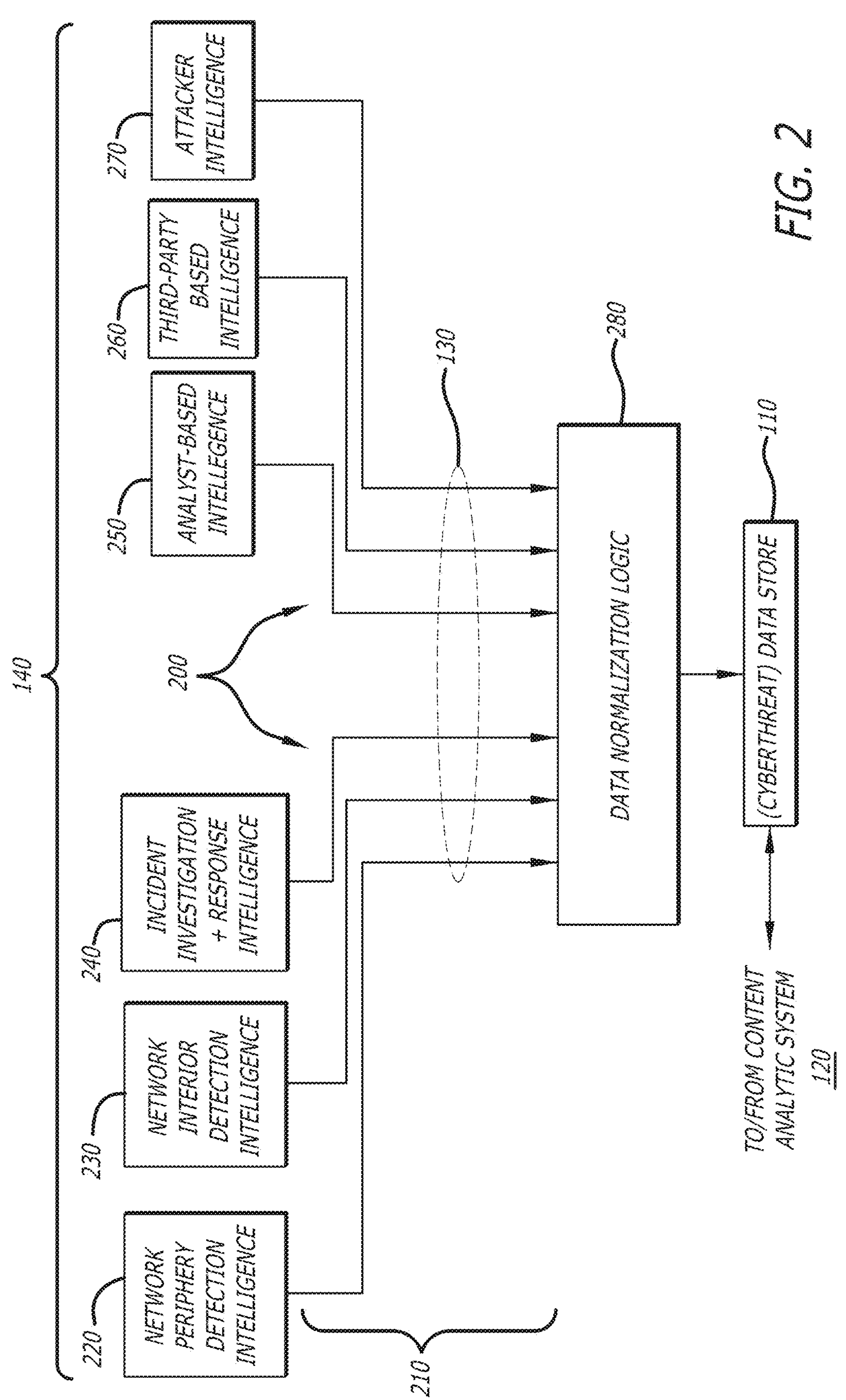
FIG. 2 is an exemplary block diagram of the data store of FIG. 1 communicatively coupled to cybersecurity intelligence resources.

Referring now to FIG. 2, an exemplary block diagram of the data store 110 communicatively coupled to the cybersecurity intelligence resources 140 of FIG. 1 is shown. For this embodiment of the disclosure, the cybersecurity intelligence resources 140 may supply cybersecurity intelligence 130 from various locations over transmission medium 200 forming a wired or wireless network 210. Delivered by the cybersecurity intelligence resources 140 using a push and/or pull communication schemes, the cybersecurity intelligence 130 may include, but is not limited or restricted to one or more of the following: (a) network periphery detection intelligence 220, (b) network interior detection intelligence 230, (c) incident investigation/response intelligence 240, (d) analyst-based intelligence 250, (c) third-party based intelligence 260, and/or (f) attacker intelligence 270. Given that different the cybersecurity intelligence 130 may have a different formats, data normalization logic 280 is interposed between the cybersecurity intelligence resources 140 and the data store 110 to generate a standardized format for the cybersecurity intelligence 130 prior to storage within the data store 110.

More specifically, the cybersecurity intelligence 130 corresponds to malware analytics or information collected for such malware analytics. For instance, the network periphery detection intelligence 220 includes cybersecurity intelligence gathered from analyses of network traffic received by an appliance, a firewall or other network devices to detect certain types of cyberthreats, namely malicious intrusions, into a protected network. This intelligence 220 may include Uniform Resource Locators (URLs) associated with malicious email or other components and/or meta-information extracted from the network traffic. The network interior detection intelligence 230 includes cybersecurity intelligence gathered from analyses of information by network devices connected within the network after passing the periphery (e.g., software agents within endpoints, email servers, etc.) in order to detect and gather meta-information associated with cyberthreats, such as malicious operations, being attempted on network devices within the network itself.

The incident investigation/response intelligence 240 includes cybersecurity intelligence gathered by cyberattack incident investigators during analyses of successful cyber-attacks. This type of cybersecurity intelligence tends to identify the nature and source of a detected cyberthreat, such as the following: name/alias of malware associated with the cyberthreat; how the malware gained entry on the network; target or targets of the cyberattack by company name, industry and/or location; and/or any remediation attempts conducted and the results of any attempts.

As further shown in FIG. 2, the analyst-based intelligence 250 includes cybersecurity intelligence gathered by highly-trained cybersecurity analysts, who analyze the detected malware to produce meta-information directed to its structure and code features. The third-party based intelligence 260 includes cybersecurity intelligence gathered from reporting agencies and other cybersecurity providers, which may be company, industry or government centric. Lastly, the attacker intelligence 270 includes cybersecurity intelligence gathered on known cyberthreat actor groups that is responsible (e.g., initiated) or is actively involved in the cyber-threat. Such cybersecurity intelligence may be directed as to whom are the attackers (e.g., name, location, etc.), whether state-sponsored attackers as well as common tools, technique and procedures used by a particular attacker that provide a better understanding the typical intent of the cyberthreat actor group (e.g., product disruption, financial information exfiltration, etc.), and the general severity of cyberthreats initiated by a particular attacker.

Collectively, some or all of these types of cybersecurity intelligence 130 may be stored and organized within the data store 110 in which each of the profiles 160 is representative of the cyberthreat associated with a cluster of each particular type of cybersecurity intelligence or perhaps multiple clusters of the same or different types of cybersecurity intelligence.

III. Profile

Figure 3:
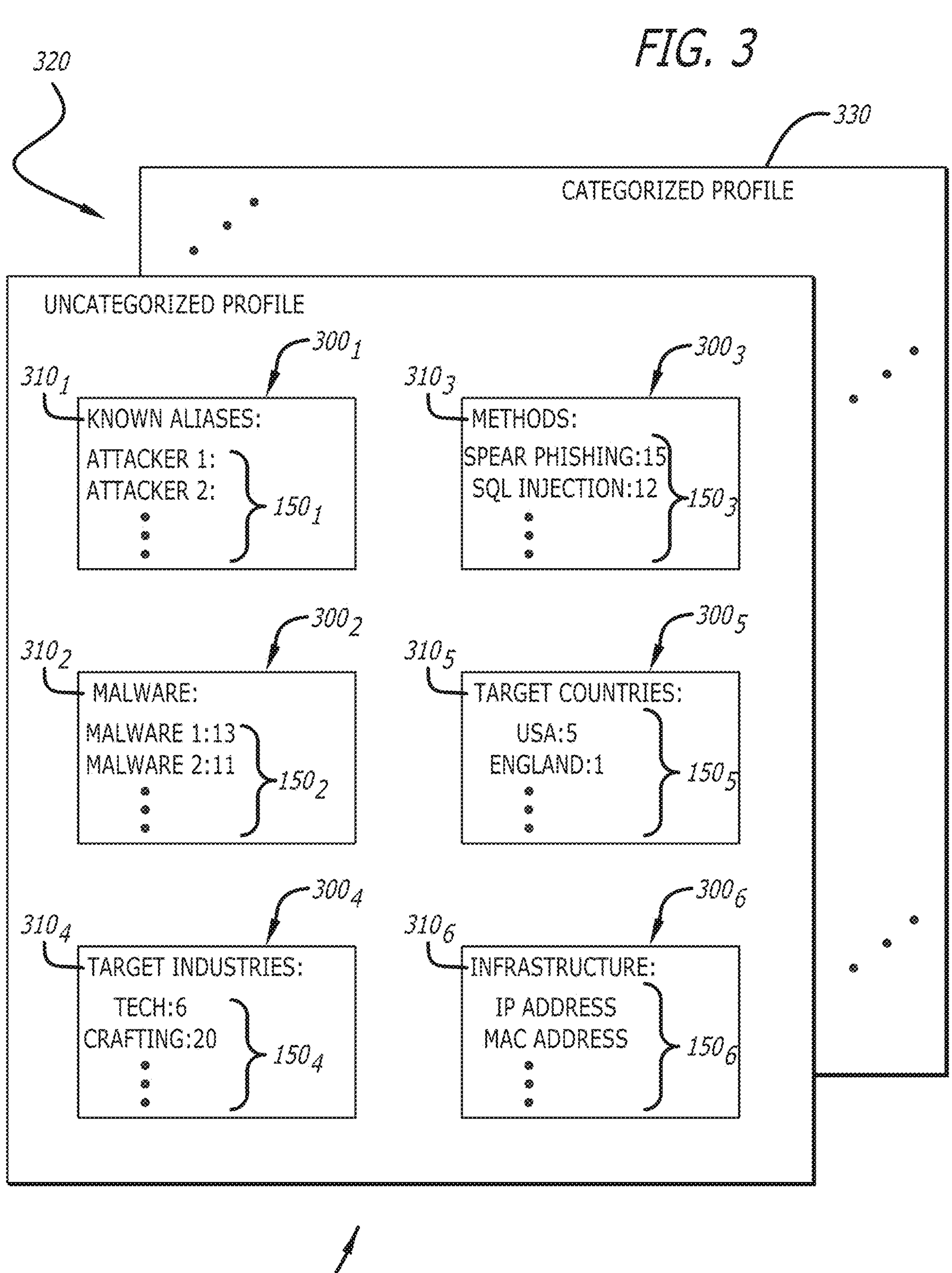
FIG. 3 is an exemplary block diagram of a profile maintained within the data store of FIG. 1.

Referring to FIG. 3, an exemplary block diagram of an exemplary data structure utilized for profiles maintained within the data store 110 of FIG. 1 is shown. Herein, each profile 160 is a structured representation of a cybersecurity intelligence cluster (e.g., cybersecurity intelligence cluster $\mathbf{135}_1$ of FIG. 1) associated with a particular cyberthreat. As the cybersecurity intelligence cluster $\mathbf{135}_1$ may include content associated with more than one investigations, where additional content is acquired over time during analyses of a cyberthreat campaign for example, the size of the cybersecurity intelligence cluster $\mathbf{135}_1$ may increase in size. Therefore, the profile 160 may be updated as more cybersecurity intelligence associated with the cyberthreat (e.g., a cyberattack, campaign, etc.) is detected.

According to one embodiment of the disclosure, the profile 160 may be configured with a plurality of logical storage regions $\mathbf{300}_1$-$\mathbf{300}_N$ (N≥1, e.g., N=6), where each logical storage region $\mathbf{300}_1$-$\mathbf{300}_6$ is responsible for maintaining a specific type (category) of forensically-related indicia therein. More specifically, for this embodiment of the profile 160, the forensically-related indicia $\mathbf{150}_1$ . . . or $\mathbf{150}_6$ may be maintained within logical storage regions $\mathbf{300}_1$-$\mathbf{300}_6$, each corresponding to a particular category $\mathbf{310}_1$-$\mathbf{310}_6$, respectively. The frequency of occurrences of certain indicium within the cybersecurity intelligence cluster $\mathbf{135}_1$ (e.g., counts) may be maintained in the logical storage regions $\mathbf{300}_1$-$\mathbf{300}_6$ as well.

As further shown in FIG. 3, the categories for each profile 160 may be static, where these particular categories $\mathbf{310}_1$-$\mathbf{310}_6$ are determined by analysts as particular types of content that tend to provide assistance in identifying a cyberthreat actor group responsible for a cyberthreat. For this illustrative embodiment of the profile 160, the indicia $\mathbf{150}_1$ . . . or $\mathbf{150}_6$ may include tactic, technique, and procedure ("TTP") information, and thus, the profile 160 may be structured to support the indicia $\mathbf{150}_1$ . . . and/or $\mathbf{150}_6$ pertaining a plurality of categories $\mathbf{310}_1$ . . . and/or $\mathbf{310}_6$. The categories $\mathbf{310}_1$-$\mathbf{310}_6$ may include, but are not limited or restricted to the following: (i) known aliases $\mathbf{310}_1$ (e.g., alias "attacker1," "attacker 2," etc.); (ii) malware names $\mathbf{310}_2$, (iii) methods $\mathbf{310}_3$ of installation and/or operation for the malware (e.g., spearfishing, powershell, etc.), (iv) targeted industries $\mathbf{310}_4$ (e.g., energy, semiconductor, etc.), (v) targeted countries $\mathbf{310}_5$ (e.g., United States, England, France, etc.), or (vi) infrastructure $\mathbf{310}_6$ (e.g., communicative information such as Internet Protocol "IP" address, Media Access Control "MAC" address, host address, etc.).

A corpus of profiles 320, including the profile 160, is maintained for each of the cybersecurity intelligence clusters. A profile within the corpus of profiles 320 (e.g., profile 160) may be labeled "uncategorized" (UNC) when its cyberthreat actor group has not been confirmed for that profile 160. Alternatively, a profile within the corpus of profiles 320 (e.g., profile 330) may be labeled with a designation for that known cyberthreat actor group when confirmed for that profile 330 (referred to as "categorized" profile). For this embodiment, the label may include an alphanumeric identifier to identify the known cyberthreat actor group.

IV. Cyberthreat Analysis System

A. Operational Flow for Model Generation/Application

Figure 4A:
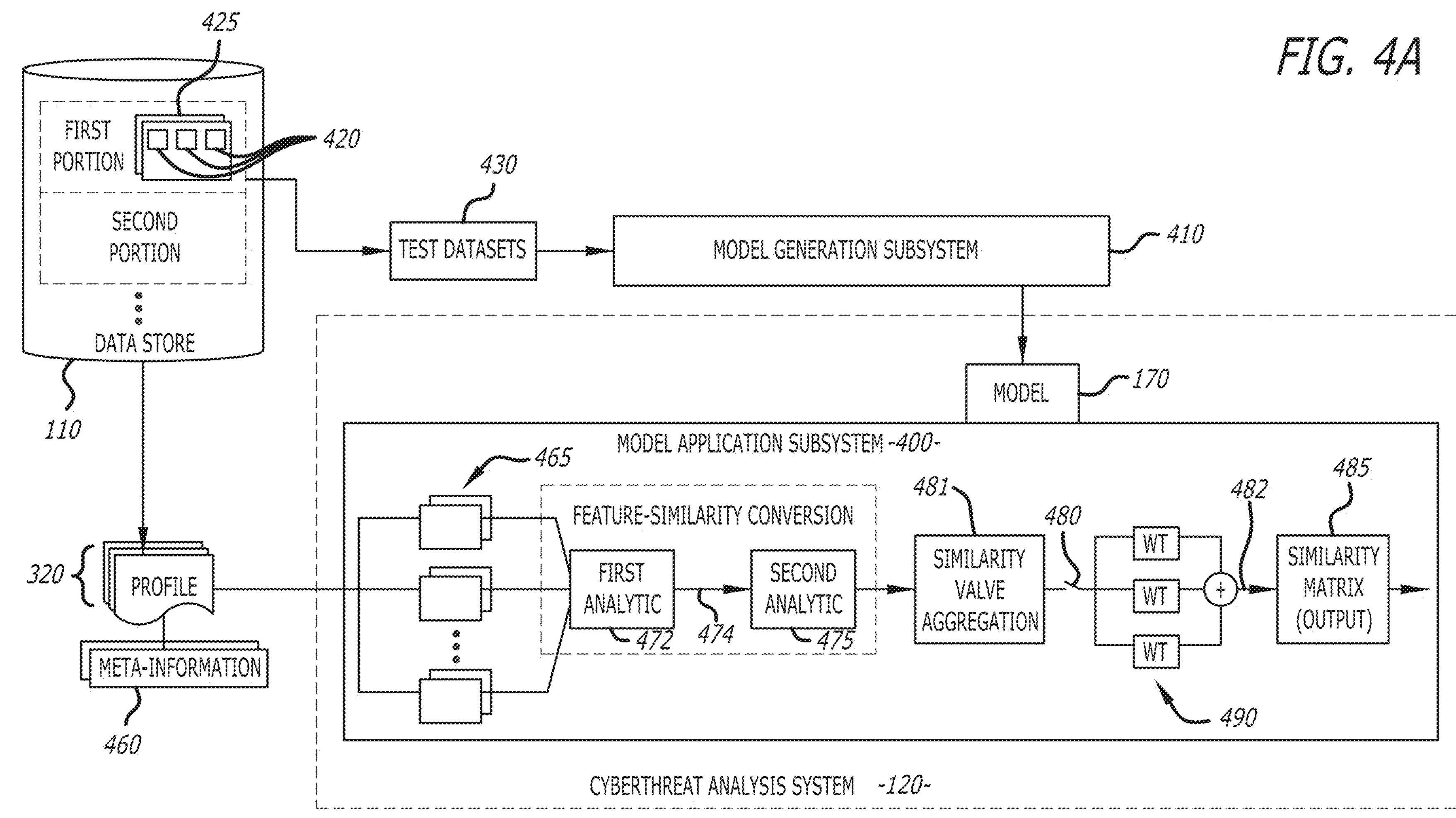
FIG. 4A is an exemplary block diagram of an operational flow for model generation and usage by the cyberthreat analysis system of FIG. 1.

Referring to now FIG. 4A, an exemplary block diagram of the operational flow for model generation and usage by the cyberthreat analysis system 120 of FIG. 1 is shown. For this embodiment of the disclosure, the cyberthreat analysis system 120 includes a model application subsystem 400, which is communicatively coupled to a model generation subsystem 410. Herein, the model application subsystem 400 may be deployed within the cyberthreat analysis system 120 of FIG. 1. However, the model generation subsystem 410 may be deployed as part of the cyberthreat analysis system 120, or alternatively, the model generation subsystem 410 may be deployed separately from the cyberthreat analysis system 120, as shown. As an illustrative example, the model generation subsystem 410 may be implemented as a separate cloud service that generates and provides the machine learning-based model 170 to at least the cyberthreat analysis system 120. As another illustrative example, the model generation subsystem 410 may be implemented as a separate network device (e.g., web server(s), data transfer device, etc.) that is communicatively coupled with the cyberthreat analysis system 120 to provide the machine learning-based model 170 (and any updated thereto) to the model application subsystem 400.

Figure 4B:
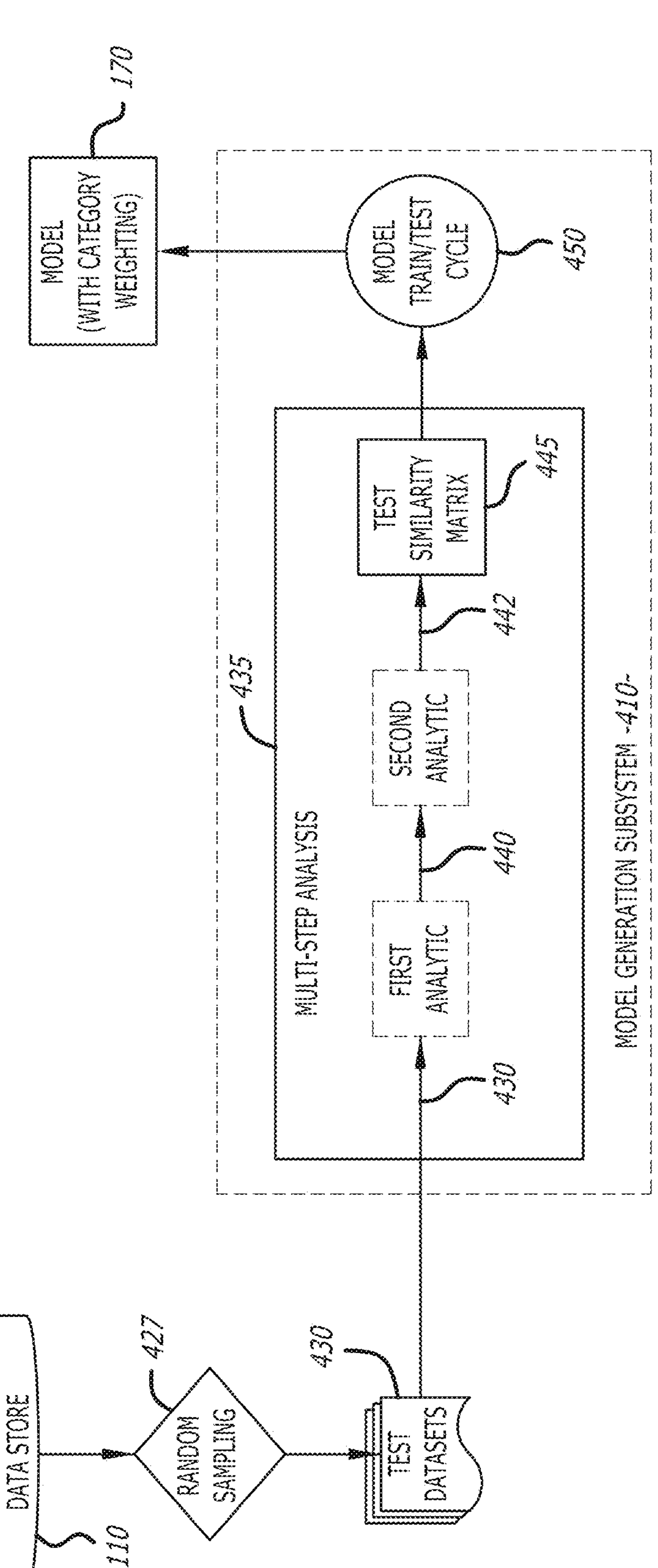
FIG. 4B is an exemplary block diagram of a model generation subsystem communicatively coupled to a model application subsystem deployed within the cyberthreat analysis system of FIG. 4A.

As shown in FIGS. 4A-4B, according to this embodiment, the model generation subsystem 410 is configured to generate the model 170 based on a first portion of content 420 maintained within the data store 110. More specifically, as shown in FIG. 4A, the model generation subsystem 410 samples the first portion of content 420, namely forensically-related indicia sampled from multiple "categorized" profiles 425 stored within the data store 110. The sampling of the forensically-related indicia 420 may be randomized (operation 427) to produce a number of test profiles 430 from the forensically-related indicia 420, as shown in FIG. 4B. For instance, each test profile 430 may be a pair of indicium associated with the forensically-related indicia 420 that may pertain to (i) the same profile category but any of the "categorized" profiles 425 or (ii) any profile category from any of the "categorized" profiles.

Each of the test profiles 430 may undergo a multi-step analysis (see FIGS. 5A-5D) 435 that performs an initial conversion of the content of each test profile 430 into a pair of feature vectors 440, which are converted into a pair of similarity values 442 that operate as a similarity vector. Thereafter, similarity vectors for each and every pairwise combination of forensically-related indicia 420 from the categorized profiles 425 are aggregated to form a test similarity matrix 445.

The contents of the test similarity matrix 445 are made available to an interim model 450 for training (test cycles) to "learn" and ultimately produce the machine learning-based model 170. Stated differently, the machine learning-based model 170 may be "tuned" by the model generation subsystem 410 to improve operation by confirming that certain similarity vectors, based on portions of the forensically-related indicia 420 procured from a particular "categorized" profile, are determined by the model 170 to be correlated to that particular "categorized" profile. Thereafter, as a prescribed level of accuracy of the analytics conducted by the interim model 450 on the randomized test profiles 430 achieves a prescribed threshold, the resultant machine learning-based model 170 is provided to the model application subsystem 400.

Referring back to FIG. 4A, the model application subsystem 400 receives the machine learning-based model 170 generated by the model generation subsystem 410 and receives, as input, content associated with the stored corpus of profiles 320 along with meta-information 460 associated with each profile (e.g., profile identifier, etc.) from the data store 110. The stored corpus of profiles 320 may include forensically-related indicia associated with "categorized" profiles that represent identified cyberthreat actor groups and/or "uncategorized" profiles that represent unidentified cyberthreat actor groups, as described above and illustrated in FIG. 3. The model application subsystem 400 receives the content associated with the corpus of profiles 320 and, as an optional capability, may aggregate the content (and update count values) within multiple (two or more) profiles of corpus of profiles 320 in the event that these multiple profiles (and corresponding cyberthreats) are associated with the same or related cyberthreat actor group.

After content aggregation, the model application subsystem 400 parses the content from each of the profiles 320 on a per-category basis in order to generate a plurality of feature groupings 465. Each of the feature groupings 465 is a collection of indicia that is associated with a particular category. Hence, where the corpus of profiles 320 contains "L" profiles with "N" categories, the model application subsystem 400 generates L×N feature groupings 465. Each of the feature groupings 465 may undergo feature-similarity conversion 470 and linear weighting 490 into a format recognized by the machine learning-based model 170.

The feature-similarity conversion 470 constitutes a multi-step analysis on content within the profiles 320 to determine levels of correlation between the cybersecurity intelligence clusters associated with each of these profiles 320. A first analytic 472 is conducted on indicia maintained in each category of each profile to produce feature vectors 474. Each feature vector 474 is configured to represent the distinctiveness of indicium within its category for a particular profile. For instance, as an illustrative example, the first analytic 472 may convert each indicium (e.g., term) within each category of each profile into a value, which represents the distinctiveness of that indicium within its category as well as across the entire corpus of profiles 320 accessible to the model application subsystem 400.

Collectively, where a category of the profile has a total of "M" distinct indicium (where M≥1), the M-dimensional feature vector 474 for that category-profile combination is produced. For processing, the dimensions of the feature vectors may be uniform, where different dimensions may be associated with different types of indicium. The first analytic 472 is repetitive for each category within the corpus of profile 320 so that a feature vector is generated for each category of each profile.

Thereafter, a second analytic 475 of the multi-step analysis is conducted among different feature vectors 474 with each category. The second analytic 475 is conducted to determine a level of correlation (similarity value) between categories of different profiles, such as the first profile and any other categorized or uncategorized profiles within the stored corpus of profiles 320 for example. This "similarity value" may be represented by a value within a second prescribed range, where a higher value within the second prescribed range represents a higher correlation between features maintained within a specific category. Following the second analytic 475, similarity vectors 480 are generated from the similarity values (i.e., each vector 480 is a collection of multiple similarity values for each profile within the corpus of profiles 320).

Thereafter, each the similarity vector 480 may be translated into a similarity metric 482 (e.g., a single value associated with a comparison between two cybersecurity intelligence clusters), where similarity metrics associated with different cybersecurity intelligence cluster comparisons are aggregated to form a similarity matrix 485. The similarity matrix 485 allows an analyst to accurately determine, in real-time, the similarity between a reference profile (e.g., the first profile) and one of more other profiles within the corpus of profiles 320. Moreover, the similarity matrix 485 represents levels of correlation between cyberthreat actor groups that are responsible for the cybersecurity intelligence clusters associated with these profiles. To improve performance, the linear weighting 490 (e.g., each weighting<1 and total linear weighting=1), may be applied to some or all of the similarity metrics 482 forming the similarity matrix 485. The weighting is conducted to alter the relevance of certain indicia categories in identifying cyberthreat actor group responsibility based on changes in the threat landscape. Also, by maintaining the results from the first analytic 472 and the second analytic 475, the model application subsystem 400 may provide virtualization as to the level of correlation between features within the profiles being compared as evidence for the conclusions reached by the machine learning-based model 170.

A. Logical Architecture for Model Generation/Application

Figure 5A:
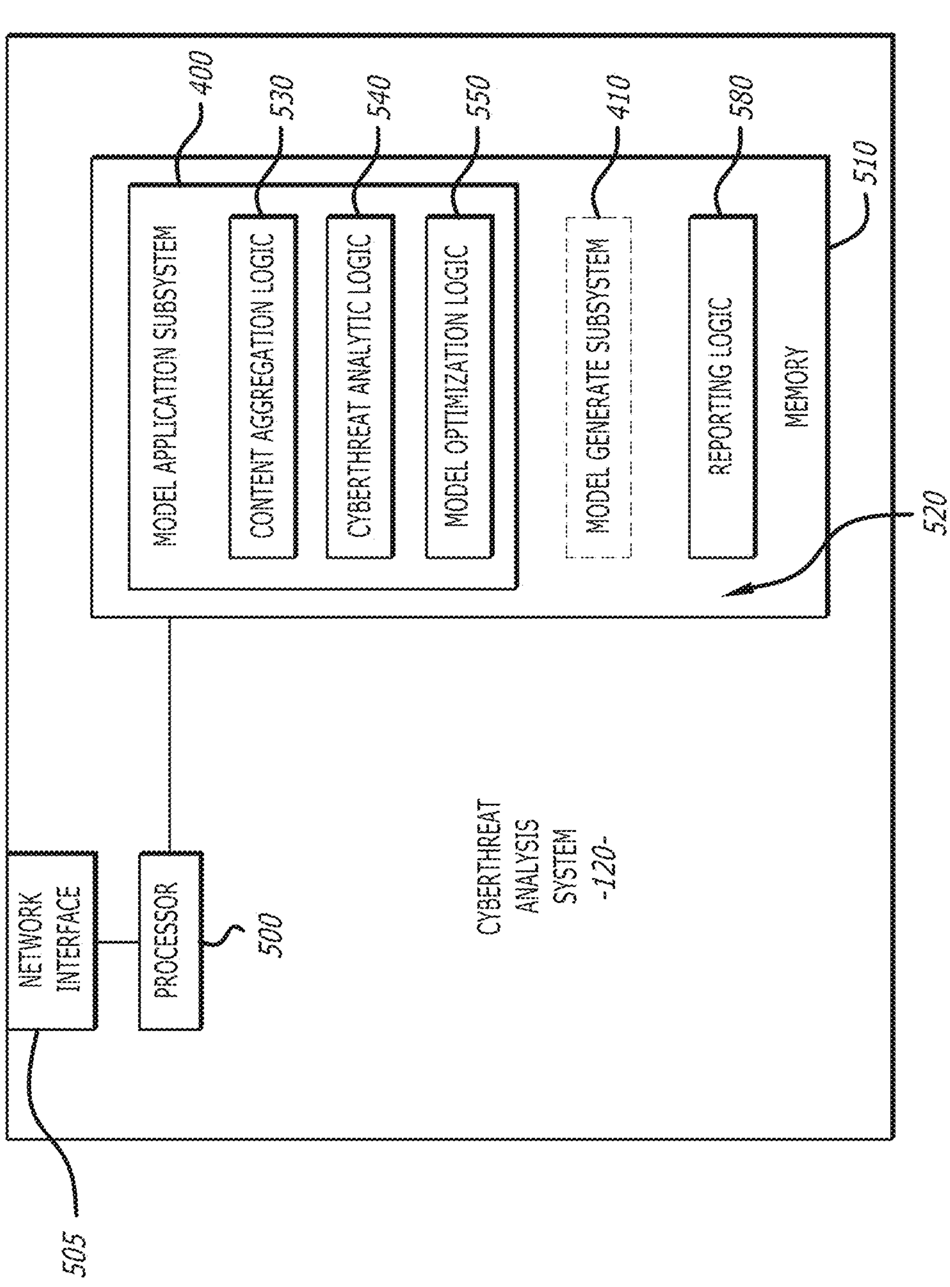
FIGS. 5A-5B are exemplary block diagrams of a logical architecture of the cyberthreat analysis system of FIG. 1.

Referring to FIG. 5A, a first exemplary block diagram of the logical architecture of the cyberthreat analysis system 120 of FIG. 1 is shown. According to one embodiment of the disclosure, the cyberthreat analysis system 120 includes a processor 500, a network/user interface 505 to receive cybersecurity intelligence and other information (e.g., logic or model updates if model generation subsystem 410 is located remotely, etc.), and a memory 510, which is configured to store logic 520 for execution by the processor 500. Examples of the stored logic 520 may include, but is not limited or restricted to model application subsystem 400, optional model generation subsystem 410 (as represented by dashed lines), and reporting logic 580. The model application subsystem 400 further includes content aggregation logic 530, cyberthreat analytic logic 540 and model optimization logic 550, as described below. The logic may be physical devices or virtual devices (e.g., virtual compute engines, virtual memory, etc.). The logical interoperability between the subsystems and logic is illustrated in FIG. 5B.

Figure 5B:
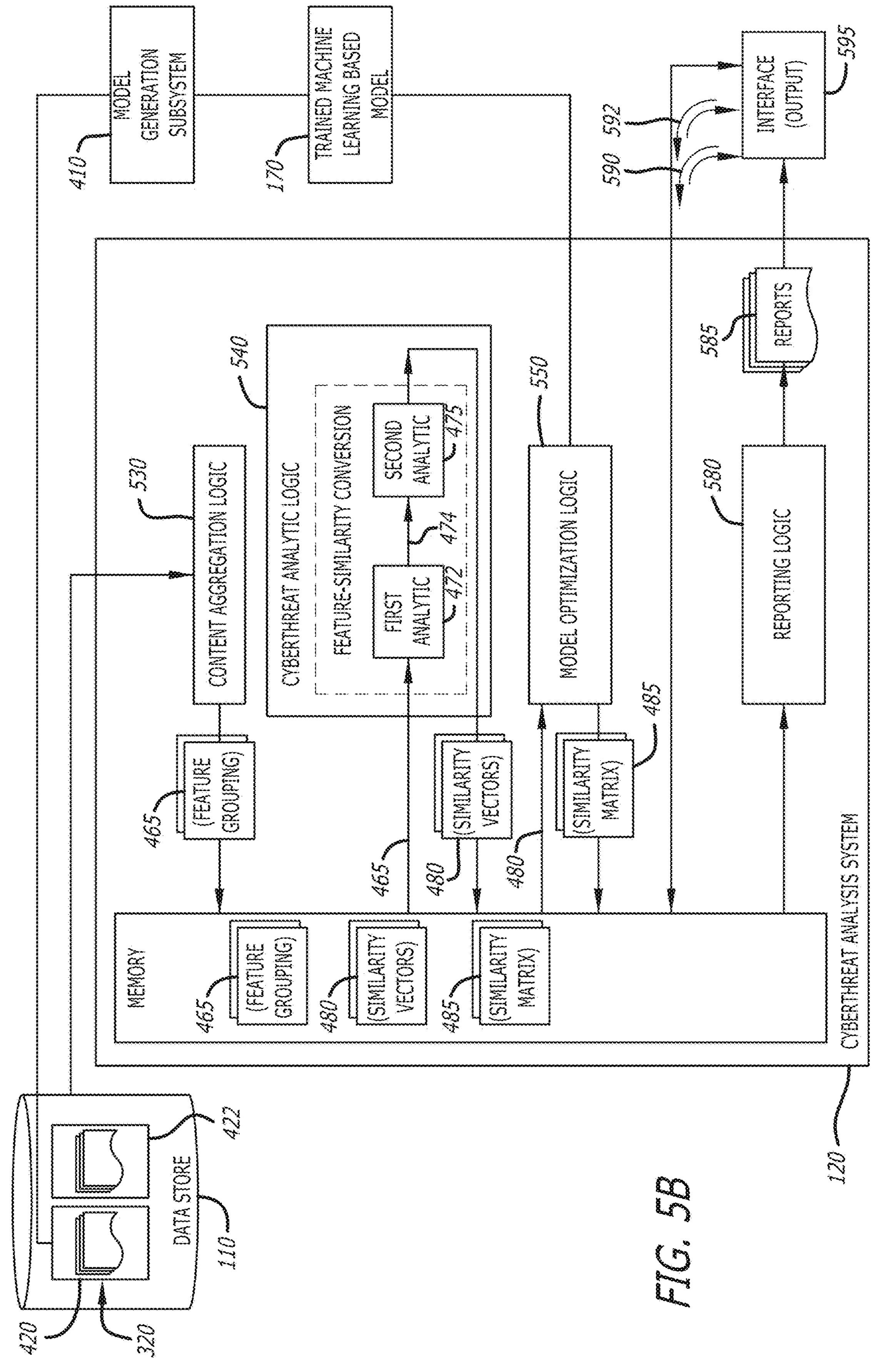

Referring now to FIG. 5B, according to this embodiment of the disclosure, the model generation subsystem 410 is configured to generate machine learning-based model 170, which is configured to evaluate similarities between profiles, each representative of a received cybersecurity intelligence cluster, in efforts to identify and merge cybersecurity intelligence clusters associated with cyberthreats from the same or related cyberthreat actor group. In particular, for this embodiment, the model 170 may be created by converting content within the corpus of profiles 320 into the similarity matrix that includes pre-determined comparisons between any profiles within the corpus of profiles.

More specifically, for this embodiment, the model generation subsystem 410 is configured to generate the machine learning-based model 170 by at least analyzing the contents of the data store 110. In some embodiments, the model generation subsystem 400 accesses the first portion of content 420 maintained within the data store 110 to generate the model 170, and optionally, a second portion of content 422 contained within the data store 110 to verify the model 170.

The model application subsystem 400 receives the model 170 generated by the model generation subsystem and applies the corpus of profiles 320, including the content associated with the "categorized" and "uncategorized profiles. In particular, the content aggregation logic 530 of the model application subsystem 400 is configured to access information regarding the corpus of profiles 320 (e.g., forensically-related indicia maintained in "categorized" profiles and "uncategorized" profiles) and separate forensically-related indicia associated with each category of the profiles for subsequent processing by the cyberthreat analytic logic. As a result, where each profile is segmented into "N" categories (N≥1, e.g., N=4, 5 or 6), the content aggregation logic 530 produces "N" feature groupings 465 of forensically-related indicia, where each of the feature groupings 465 corresponding to a particular category.

Thereafter, the cyberthreat analytic logic 540 is configured to conduct the multi-step analysis on content associated with the feature groupings 465 to determine levels of correlation between the cybersecurity intelligence clusters associated with each of these profiles 320. The multi-step analysis involves a first analytic 472 that is conducted on content within the feature groupings 465, namely the forensically-related indicia associated with the "N" categories, to produce "N" feature vectors 474. Each feature vector 474 includes a value 545 associated with each feature within that profile category.

Figure 5C:
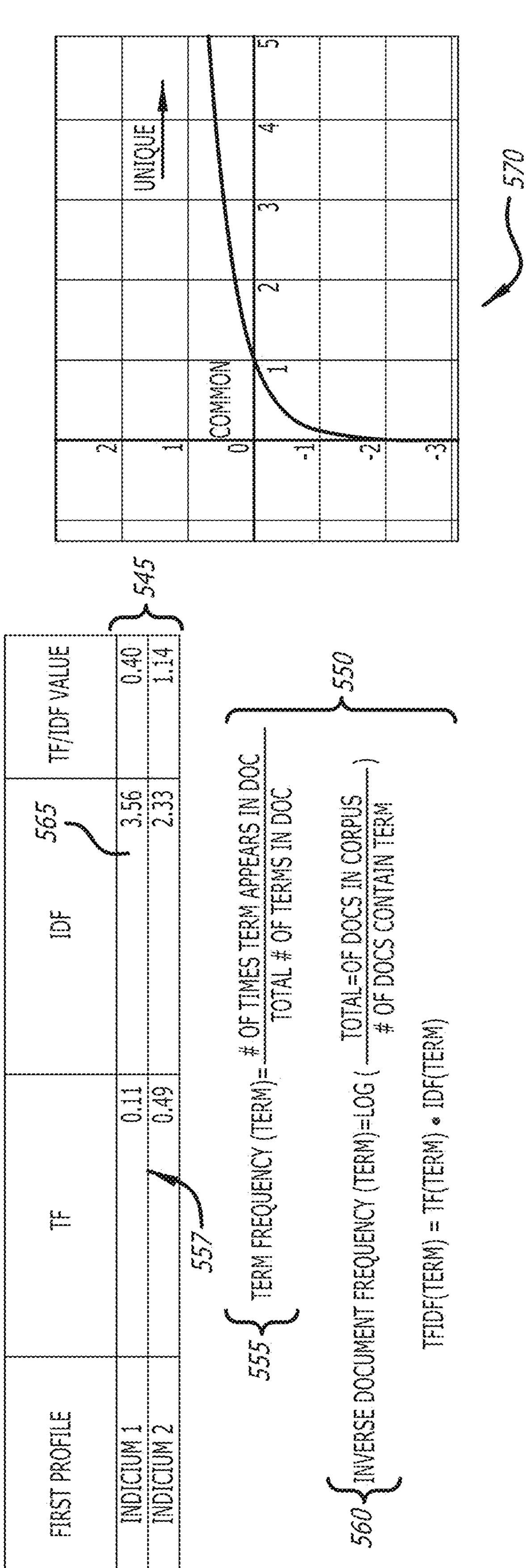
FIG. 5C is an exemplary diagram operability of a first analytic (TD_IDF) conducted by the cyberthreat analytic logic operating within the cyberthreat analysis system of FIG. 1.

According to one embodiment of the disclosure, as shown in FIG. 5C, each value 545 is generated based on a Term Frequency-Inverse Document Frequency (TF-IDF) conversion technique 550 that determines which indicia is more influential in determining a cyberthreat actor group than other indicia.

The TF-IDF conversion technique 550 includes two operations to compute a level of distinctiveness associated with salient information within each cybersecurity intelligence cluster that is represented by forensically-related indicia within the profiles. The first (TF) operation 555 generates a first (TF) value 557 that represents a ratio between (i) how often (count) particular indicium (e.g., term) appeared within content of a profile under analysis and (ii) a total number of all indicia (e.g., terms) within that profile. The second (IDF) operation 560 computes a second (IDF) value 565 of how frequently the particular indicium (e.g., term) appears across all of the profiles. The second (IDF) value 565 is a result produced from a natural logarithmic operation being conducted on a ratio between the total number of profiles within the corpus of profiles and the number of profiles including the particular indicium. As evident by the illustrative graph 570, when the ratio is close to "1" (i.e. very common terms), the logarithmic operation sets the second (IDF) value 565 near-zero, thus down-weighting the value 545 being a product of the first (TF) value 557 and the second (IDF) value 565 (TF×IDF value). Hence, the presence of a much higher second (IDF) value will result in a higher value 545. The values for each indicium within each category for each profile are aggregated to form feature vectors 474 for each category within each profile, as shown in FIG. 5B.

Figure 5D:
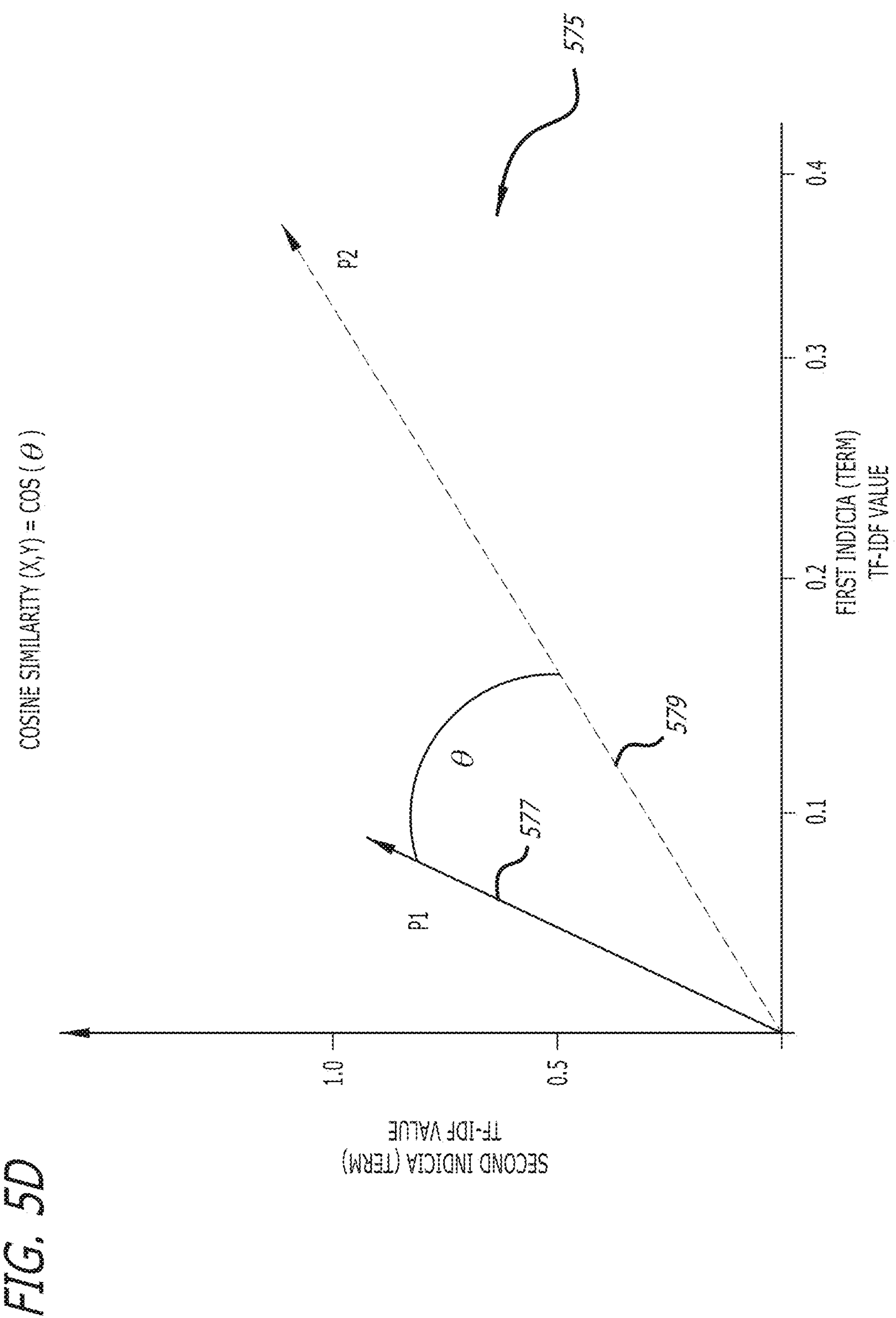
FIG. 5D is an exemplary diagram operability of a second analytic (Cosine Similarity) conducted by the cyberthreat analytic logic operating within the cyberthreat analysis system of FIG. 1.

Referring back to FIG. 5B, the cyberthreat analytic logic 540 is further configured to conduct the second analytic 475 on combinations of feature vectors 474 to determine the difference between cyberthreat actor groups. In some embodiments, feature vector similarity may be determined using, for example, a Cosine Similarity technique 575 as shown in FIG. 5D. The Cosine Similarity technique 575 may be used to evaluate a level of correlation (similarity) of each of the profiles (e.g., first profile "P1" and second profile "P2") by plotting the feature vectors 577 and 579 representative of the cyberthreat. Where the vectors are directed in the same direction (e.g., in parallel), the compared profiles (P1, P2) may be highly correlated. The greater degree of angular offset (θ) from the parallel direction indicates a corresponding diminishing level of correlation (similarity). The level of correlation may be represented by a particular score (i.e., similarity value) within the second prescribed range, where a similarity value towards the ends of this range identifies higher/lower levels of correlation (increased/decreased similarity).

It is contemplated that FIG. 5D illustrates only two of the dozens or hundreds of dimensions, which are used to calculate cosine similarity. Two dimensions are used in this case to allow it to be easily plotted for human viewing. In the example, two Groups are represented by a vector composed of their TF-IDF values for a first indicium (term 1) along an x-axis and a second indicium (term 2) along the y-axis. The cosine value of the angle (θ) between these terms serves as our similarity value. This can also interpreted as a measure of 'how parallel' the two vectors are in this space. In reality we perform this evaluation for all groups, across all terms within each category, and thus arrive as cosine similarity values for each category and each pair of groups in the corpus.

As shown in FIG. 5B, using TF-IDF and Cosine Similarity described above, category-specific similarities (i.e., similarity values) for every combination of profiles within the corpus of profiles. Furthermore, cyberthreat analytic logic 540 may be configured to combine these similarity values associated with category comparisons of a particular profile combination to form a similarity vector 480. The similarity vector 480 may be subsequently used in determining, in real-time, a level of correlation between an identified, cyberthreat actor group associated with a reference profile and one or more cyberthreat actor groups among a corpus of profiles.

As further shown in FIG. 5B, the model optimization logic 550 is configured to convert the similarity vectors 480 into the similarity matrix 485, as described above. According to one embodiment of the disclosure, the model optimization logic 550 may apply a linear weighting of each of the similarity values, without changes to other model functionality, where an operation on the weighted similarity values (e.g., arithmetic operation such as addition) produces a similarity metric associated with a profile comparison. The similarity metrics, generated by weighting and arithmetic operations on the similarity values forming similarity vectors 480 for all profile combinations (e.g., similarity metric=weighting1*(similarity value for malware category+ weighting2*(similarity value for targeted industry category+ . . . ), are aggregated as the similarity matrix 485. For a query message 590 (request for a sorting listing of profiles similar to a reference profile) and a merge message 592 (request for a sorted listing of the most common profile pairs), the similarity matrix 485 is accessed and the results are sorted and return to a requesting user for display via interface 595.

Herein, the similarity computations based on TF-IDF and Cosine Similarity are merely illustrative of computations to compute category-specific similarities, as described above. It is contemplated that other approaches may be employed to compute determine the similarity of cybersecurity intelligence.

The reporting logic 580 receives from information associated with merged profiles associated with known and/or unknown cyberthreat actor groups for further investigation by cyberthreat analysts and/or for alerting cybersecurity investigators of such findings. In some embodiments, cybersecurity investigators may receive reports 585, such as displayable or printable listing, charts, graphs for example, which may include information associated with newly merged cyberthreat actor groups to access network and system vulnerability associated with that cyberthreat actor group. Also, the reports may provide for automated remediation by selection of a displayable object, which associates a cybersecurity actors and halts (temporarily or permanently) communications with an originating source of the cybersecurity intelligence.

Figure 6B:
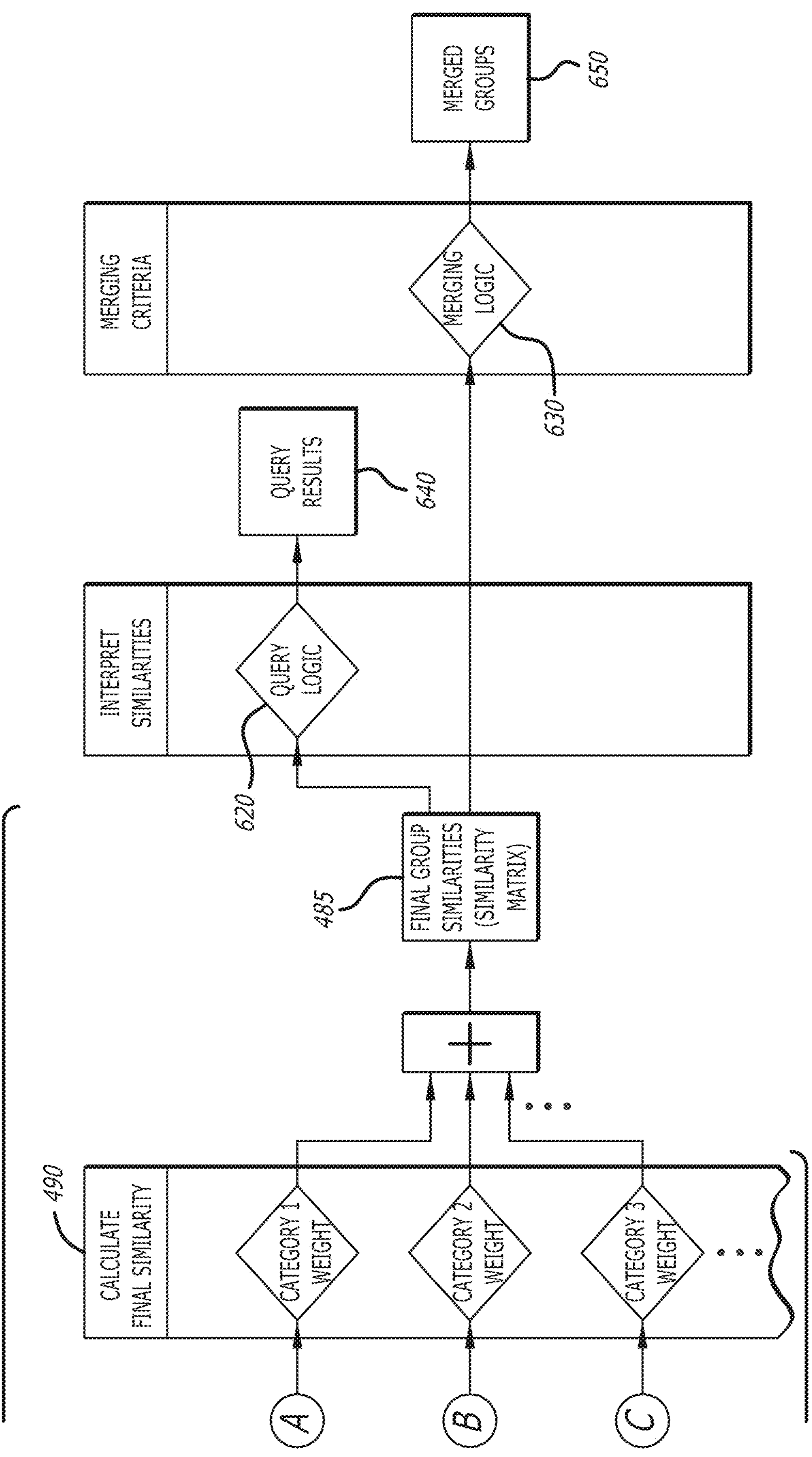

Referring now to FIGS. 6A-6B, exemplary block diagrams of an operational flow of the cyberthreat analysis system 120 of FIG. 5A are shown. According to one embodiment of the disclosure, as shown in FIG. 6A in response to a triggering event (e.g., time-based trigger, change in a profile or predetermined number or percentage of profiles, etc.), the machine learning-based model 170 may be updated by conducting analytics on the indicia included within the any selected profile or a combination of profiles in order to uncover connections between a cyberthreat actor group responsible for a particular cyberthreat or a new of existing cyberthreat actor group being responsible for multiple cyberthreats. Although, as an alternative embodiment, the machine learning-based model 170 may be configured to conduct analytics on a collection of data larger than the profiles 320.

Although not shown, cybersecurity intelligence may be received from one or more network devices and stored within the data store 110 of FIG. 1. The profile 160 may be generated to maintain forensically-related indicia associated with each cybersecurity intelligence cluster and the number of occurrences of each indicium. The categories for indicia to be included in the corpus of profiles 320 are determined by analysts.

As shown in FIG. 6A, operating in accordance with the machine learning-based model 170, the cyberthreat analysis system conducts a multi-step analysis 600 on content within the profiles 320 to determine levels of correlation between the cybersecurity intelligence clusters associated with each of these profiles. The multi-step analysis 600 may be conducted to identify profiles within the corpus of profiles 320 that have similar indicia and/or a determined a level of correlation, and as a result, identifies the cyberthreats represented by these profiles 320 may have been perpetuated by the same cyberthreat actor group or related cyberthreat actor groups.

For this embodiment of the disclosure, the multi-step analysis 600 involves the first analytic 472 conducted on indicia 610 maintained in each profile category to produce feature vectors 474 for each category. Each feature vector 474 is configured to represent the distinctiveness of indicium within its category. More specifically, the results of the first analytic form a feature vector for each category (e.g., Unclassified_Malware1=<0.23, 0.013, 0045, . . . >).

Additionally, the second analytic 475 of the multi-step analysis 600 is conducted between the feature vectors 474 associated with each category of the first profile to feature vectors associated with corresponding categories from the other profiles within the corpus of profiles, which may include other "categorized" profiles and/or "uncategorized profiles 620. The second analytic 475 is conducted to determine a level of correlation (similarity value) between categories of different profiles, such as the first profile and any categorized or uncategorized profiles within the stored corpus of profiles. This "similarity value" may be represented by a value within a second prescribed range, where a higher value within the second prescribed range represents a higher correlation between features maintained within a specific category. The second analytic 475 is further configured to generate a similarity vector 480 (i.e., a collection of multiple similarity values between the first profile and another profile within the corpus of profiles).

Thereafter, the similarity vector 480 may be translated into a similarity metric, where operations are conducted iteratively for all of the profiles to form the similarity matrix 485, which allows an analyst to accurately determine, in real-time, the similarity between a reference profile (e.g., the first profile) and one of more other profiles within the corpus of profiles. According to one embodiment of the disclosure, this translation from the similarity vector 480 to a similarity metric may include conducting a weighted arithmetic operations on the similarity values within the similarity vector 480 as described above. Moreover, the similarity matrix 485 represents levels of correlation between cyberthreat actor groups that are responsible for the cybersecurity intelligence clusters associated with these profiles.

As shown in FIG. 6B, to improve performance, the linear weighting 490 may be applied to some or all of the similarity metrics forming the "similarity matrix." The weighting 490 is conducted to alter the relevance of certain indicia categories in identifying cyberthreat actor group responsibility based on changes in the threat landscape. Also, by maintaining the results from the first and second analytics 472 and 474, the cyberthreat analysis system 120 may provide visibility as to the level of correlation between features within the profiles 320 being compared as evidence for the conclusions reached by the machine learning-based model 170.

Responsive to a query message 620 (request for a sorting listing of profiles similar to a reference profile) or a merge message 630 (request for a sorted listing of the most common profile pairs), the similarity matrix 485 is accessed and the results 640 and 650, respectively. The results 640 and 650 may be sorted and returned for display and review by a cybersecurity investigator.

In the foregoing description, the invention is described with reference to specific exemplary embodiments thereof. As described above, cybersecurity intelligence reports are associated with each other to generate cybersecurity intelligence clusters, which may be assigned to known or unknown cyberthreat actor groups based on analyst conclusions. Herein, in some instances, certain uncategorized cybersecurity intelligence clusters (clusters assigned with an unknown cyberthreat actor group) may be automatically assigned to a particular known cyberthreat actor group based on the model described above. However, it will be evident that various modifications and changes may be made thereto without departing from the broader spirit and scope of the invention as set forth in the appended claims.

What is claimed is:

1. A computerized method for associating cyberthreat actor groups responsible for different cyberthreats, comprising:

receiving, by a computing system comprising one or more computing devices, a plurality of clusters of cybersecurity information respectively associated with a plurality of cyberthreats, wherein the cybersecurity information comprises a profile associated with at least a first cluster of the plurality of clusters;

generating, by the computing system, a plurality of feature vectors respectively for the plurality of clusters of cybersecurity information;

processing, by the computing system, the plurality of feature vectors with a machine-learned model to generate one or more similarity metrics, wherein each of the one or more similarity metrics describes a similarity between the first cluster and at least one additional cluster of the plurality of clusters of cybersecurity information;

associating, by the computing system, at least the first cluster of the clusters of cybersecurity information with a particular cyberthreat actor group based at least in part on the one or more similarity metrics; and updating, by the computing system, based on associating the first cluster with the particular cyberthreat actor group, the profile associated with the first cluster to include one or more characteristics associated with the first cluster.

2. The method of claim 1, wherein generating the respective feature vector for each of the clusters of cybersecurity information comprises:

extracting a respective set of forensically-related indicia from each of the clusters of cybersecurity information; and generating the respective feature vector for each cluster of cybersecurity information from the set of forensically-related indicia associated with the cluster of cybersecurity information.

3. The method of claim 2, wherein at least one indicium in at least one of the sets of forensically-related indicia comprises a frequency of occurrence of a type of content within the cluster of cybersecurity information.

4. The method of claim 3, wherein the type of content comprises one or more of the following: (i) known aliases, (ii) malware names, (iii) methods of installation and/or operation for the malware, (iv) targeted industries, (v) targeted countries, or (vi) infrastructure.

5. The method of claim 1, wherein processing, by the computing system, the plurality of feature vectors with a machine-learned model to generate one or more similarity metrics comprises determining, by the computing system, a cosine similarity between two of the plurality of feature vectors.

6. The method of claim 1, wherein the machine-learned model applies a plurality of learned weight values to generate the one or more similarity metrics.

7. The method of claim 1, wherein associating, by the computing system, at least the first cluster of the clusters of cybersecurity information with the particular cyberthreat actor group based at least in part on the one or more similarity metrics comprises merging, by the computing system, the first cluster with a second cluster of the clusters of cybersecurity information based on the one or more similarity metrics between the first cluster and the second cluster, and wherein the second cluster has previously been associated with the particular cyberthreat actor group.

8. The method of claim 1, wherein the machine-learned model has been trained to generate similarity vectors that correlate cybersecurity data to a pre-categorized profile.

9. A computing system for associating cyberthreat actor groups responsible for different cyberthreats, the computing system comprising:

one or more processors; and one or more non-transitory computer-readable media that store:

a machine-learned model; and computer-executable instructions for performing operations, the operations comprising:

receiving, by the computing system, a plurality of clusters of cybersecurity information respectively associated with a plurality of cyberthreats, wherein the cybersecurity information comprises a profile associated with at least a first cluster of the plurality of clusters;

generating, by the computing system, a plurality of feature vectors respectively for the plurality of clusters of cybersecurity information;

processing, by the computing system, the plurality of feature vectors with the machine-learned model to generate one or more similarity metrics, wherein each of the one or more similarity metrics describes a similarity between the first cluster and at least one additional cluster of the plurality of clusters of cybersecurity information;

associating, by the computing system, at least the first cluster of the clusters of cybersecurity information with a particular cyberthreat actor group based at least in part on the one or more similarity metrics; and updating, by the computing system, based on associating the first cluster with the particular cyberthreat actor group, the profile associated with the first cluster to include one or more characteristics associated with the first cluster.

10. The computing system of claim 9, wherein generating the respective feature vector for each of the clusters of cybersecurity information comprises:

extracting a respective set of forensically-related indicia from each of the clusters of cybersecurity information; and generating the respective feature vector for each cluster of cybersecurity information from the set of forensically-related indicia associated with the cluster of cybersecurity information.

11. The computing system of claim 10, wherein at least one indicium in at least one of the sets of forensically-related indicia comprises a frequency of occurrence of a type of content within the cluster of cybersecurity information.

12. The computing system of claim 11, wherein the type of content comprises one or more of the following: (i) known aliases, (ii) malware names, (iii) methods of installation and/or operation for the malware, (iv) targeted industries, (v) targeted countries, or (vi) infrastructure.

13. The computing system of claim 9, wherein processing, by the computing system, the plurality of feature vectors with a machine-learned model to generate one or more similarity metrics comprises determining, by the computing system, a cosine similarity between two of the plurality of feature vectors.

14. The computing system of claim 9, wherein the machine-learned model applies a plurality of learned weight values to generate the one or more similarity metrics.

15. The computing system of claim 9, wherein associating, by the computing system, at least the first cluster of the clusters of cybersecurity information with the particular cyberthreat actor group based at least in part on the one or more similarity metrics comprises merging, by the computing system, the first cluster with a second cluster of the clusters of cybersecurity information based on the one or more similarity metrics between the first cluster and the second cluster, and wherein the second cluster has previously been associated with the particular cyberthreat actor group.

16. The computing system of claim 9, wherein the machine-learned model has been trained to generate similarity vectors that correlate cybersecurity data to a pre-categorized profile.

17. One or more non-transitory computer-readable media that store:

a machine-learned model; and computer-executable instructions for performing operations, the operations comprising:

receiving, by a computing system, a plurality of clusters of cybersecurity information respectively associated with a plurality of cyberthreats, wherein the cybersecurity information comprises a profile associated with at least a first cluster of the plurality of clusters;

generating, by the computing system, a plurality of feature vectors respectively for the plurality of clusters of cybersecurity information;

processing, by the computing system, the plurality of feature vectors with the machine-learned model to generate one or more similarity metrics, wherein each of the one or more similarity metrics describes a similarity between the first cluster and at least one additional cluster of the plurality of clusters of cybersecurity information;

associating, by the computing system, at least the first cluster of the clusters of cybersecurity information with a particular cyberthreat actor group based at least in part on the one or more similarity metrics; and updating, by the computing system, based on associating the first cluster with the particular cyberthreat actor group, the profile associated with the first cluster to include one or more characteristics associated with the first cluster.

18. The one or more non-transitory computer-readable media of claim 17, wherein generating the respective feature vector for each of the clusters of cybersecurity information comprises:

extracting a respective set of forensically-related indicia from each of the clusters of cybersecurity information; and generating the respective feature vector for each cluster of cybersecurity information from the set of forensically-related indicia associated with the cluster of cybersecurity information.

19. The one or more non-transitory computer-readable media of claim 18, wherein at least one indicium in at least one of the sets of forensically-related indicia comprises a frequency of occurrence of a type of content within the cluster of cybersecurity information.

20. The one or more non-transitory computer-readable media of claim 17, wherein processing, by the computing system, the plurality of feature vectors with a machine-learned model to generate one or more similarity metrics comprises determining, by the computing system, a cosine similarity between two of the plurality of feature vectors.

* * * * *